(12) United States Patent
Ichimaru et al.

(10) Patent No.: US 11,238,738 B2
(45) Date of Patent: Feb. 1, 2022

(54) INFORMATION PROVIDING SYSTEM, SERVER, MOBILE TERMINAL, AND COMPUTER PROGRAM

(71) Applicant: Sumitomo Electric Industries, Ltd., Osaka (JP)

(72) Inventors: Toshihiro Ichimaru, Osaka (JP); Shingo Ohashi, Osaka (JP); Izumi Memezawa, Osaka (JP); Koichi Takayama, Osaka (JP); Yasuhiko Nishi, Osaka (JP); Katsunori Ushida, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 239 days.

(21) Appl. No.: 16/484,380

(22) PCT Filed: Nov. 13, 2017

(86) PCT No.: PCT/JP2017/040787
§ 371 (c)(1),
(2) Date: Aug. 7, 2019

(87) PCT Pub. No.: WO2018/146882
PCT Pub. Date: Aug. 16, 2018

(65) Prior Publication Data
US 2020/0005644 A1 Jan. 2, 2020

(30) Foreign Application Priority Data

Feb. 8, 2017 (JP) .............................. JP2017-021105
Mar. 7, 2017 (JP) .............................. JP2017-042578

(51) Int. Cl.
*G08G 1/16* (2006.01)
*H04W 4/44* (2018.01)
(Continued)

(52) U.S. Cl.
CPC ........... *G08G 1/164* (2013.01); *G08G 1/0112* (2013.01); *G08G 1/20* (2013.01); *H04W 4/40* (2018.02);
(Continued)

(58) Field of Classification Search
CPC ........... H04W 4/44; H04W 4/40; H04W 4/90; H04W 4/38; G08G 1/164; G08G 1/0112;
(Continued)

(56) References Cited

U.S. PATENT DOCUMENTS

2016/0031397 A1* 2/2016 Alamanos ............ G08B 25/001
340/425.5
2016/0042644 A1* 2/2016 Velusamy ............ G08G 1/0116
340/435
2016/0275796 A1* 9/2016 Kim ........................ G08G 1/166

FOREIGN PATENT DOCUMENTS

JP 10-91899 A 4/1998
JP 2007-323117 A 12/2007
(Continued)

*Primary Examiner* — Joseph H Feild
*Assistant Examiner* — Sharmin Akhter
(74) *Attorney, Agent, or Firm* — Baker Botts L.L.P.; Michael A. Sartori

(57) ABSTRACT

An information providing system according to one mode of the present disclosure includes: one or a plurality of mobile terminals each configured to transmit first information based on own sensor information to a server; one or a plurality of fixed terminals each configured to transmit second information based on own sensor information to the server; and the server configured to generate third information on the basis of the first information and the second information that have been received by the server, and configured to transmit the generated third information to at least the mobile terminal.

16 Claims, 20 Drawing Sheets

(51) Int. Cl.
    *H04W 4/40*     (2018.01)
    *G08G 1/01*     (2006.01)
    *G08G 1/00*     (2006.01)
    B60W 30/09     (2012.01)
    G05D 1/02     (2020.01)

(52) U.S. Cl.
    CPC .............. *H04W 4/44* (2018.02); *B60W 30/09* (2013.01); *G05D 1/0276* (2013.01)

(58) Field of Classification Search
    CPC .. G08G 1/20; G08G 1/096775; G08G 1/0116; G08G 1/0141; B60W 30/09; B60W 2554/802; B60W 2554/804; G05D 1/0276; B60R 21/00
    See application file for complete search history.

(56) References Cited

FOREIGN PATENT DOCUMENTS

| | | |
|---|---|---|
| JP | 2010-188981 A | 9/2010 |
| JP | 2013-109746 A | 6/2013 |
| JP | 2014-89491 A | 4/2014 |
| WO | 2013/069131 A1 | 5/2013 |

\* cited by examiner

FIG. 17 [INFORMATION PROVIDING SYSTEM IN WHICH VEHICLE HAS ACTION PREDICTION FUNCTION]

INFORMATION PROVIDING SYSTEM, SERVER, MOBILE TERMINAL, AND COMPUTER PROGRAM

TECHNICAL FIELD

The present invention relates to an information providing system, a server, a mobile terminal, and a computer program.

This application claims priority on Japanese Patent Application No. 2017-021105 filed on Feb. 8, 2017, and Japanese Patent Application No. 2017-042578 filed on Mar. 7, 2017, the entire contents of which are incorporated herein by reference.

BACKGROUND ART

A traffic system that informs an occupant of a vehicle about an abnormal event that has occurred in another vehicle has already been proposed (see PATENT LITERATURE 1).

As one mode of the traffic system, PATENT LITERATURE 1 describes a traffic system that includes: a central apparatus of a traffic control center; a plurality of roadside communication devices which communicate with the central apparatus through dedicated lines; and an on-vehicle communication device which wirelessly communicates with each roadside communication device (see paragraphs 0104 to 0129 of PATENT LITERATURE 1).

In this traffic system, the central apparatus determines whether or not behavior of each vehicle corresponds to a predetermined abnormal event, on the basis of vehicle information (travel trail) that includes the time at which data was generated, the vehicle speed, the vehicle position, the heading direction, and the like that have been uplink-transmitted by the vehicle.

When the central apparatus has detected a predetermined abnormal event, the central apparatus downlink-transmits, to a vehicle, information indicating the content, the location, and the like of the abnormal event. The vehicle having received this information informs the occupant of occurrence of the abnormal event. Accordingly, driving support control for coping with the abnormal travel is performed.

CITATION LIST

Patent Literature

PATENT LITERATURE 1: Japanese Laid-Open Patent Publication No. 2013-109746

SUMMARY OF INVENTION (1) A system according to one mode of the present disclosure includes: one or a plurality of mobile terminals each configured to transmit first information based on own sensor information to a server; one or a plurality of fixed terminals each configured to transmit second information based on own sensor information to the server; and the server configured to generate third information on the basis of the first information and the second information that have been received by the server, and configured to transmit the generated third information to at least the mobile terminal.

(19) A server according to one mode of the present disclosure is a server configured to perform wireless communication with one or a plurality of mobile terminals and one or a plurality of fixed terminals. The server includes: a communication unit configured to receive, from the mobile terminal, first information based on sensor information of the mobile terminal, and configured to receive, from the fixed terminal, second information based on sensor information of the fixed terminal; and a control unit configured to generate third information on the basis of the received first information and the received second information and control the communication unit so as to transmit the generated third information to at least the mobile terminal.

(20) A mobile terminal according to one mode of the present disclosure is a mobile terminal configured to perform wireless communication with a server which performs wireless communication with one or a plurality of fixed terminals. The mobile terminal includes: a communication unit configured to transmit first information based on own sensor information to the server; and a control unit configured to control the communication unit so as to receive third information generated by the server on the basis of the first information and second information based on sensor information of the fixed terminal. The control unit generates the first information on the basis of the own sensor information and the received third information.

(21) A computer program according to one mode of the present disclosure is a computer program configured to cause a computer to function as a server which performs wireless communication with one or a plurality of mobile terminals and one or a plurality of fixed terminals. The computer program causes the computer to perform: a step of receiving, from the mobile terminal, first information based on sensor information of the mobile terminal, and of receiving, from the fixed terminal, second information based on sensor information of the fixed terminal; and a step of generating third information on the basis of the received first information and the received second information, and controlling a communication unit of the server so as to transmit the generated third information to at least the mobile terminal.

(22) A computer program according to another mode of the present disclosure is a computer program configured to cause a computer to function as a mobile terminal which performs wireless communication with a server which performs wireless communication with one or a plurality of fixed terminals. The computer program causes the computer to perform: a step of transmitting first information based on own sensor information to the server; a step of controlling a communication unit of the mobile terminal so as to receive third information generated by the server on the basis of the first information and second information based on sensor information of the fixed terminal; and a step of generating the first information on the basis of the own sensor information and the received third information.

The present invention can be realized not only as a system and an apparatus having the characteristic configurations as described above, but also as a program for causing a computer to perform such characteristic configurations.

In addition, the present invention can be realized as a semiconductor integrated circuit that realizes a part or all of the system and the apparatus.

DESCRIPTION OF EMBODIMENTS

Figure 1:
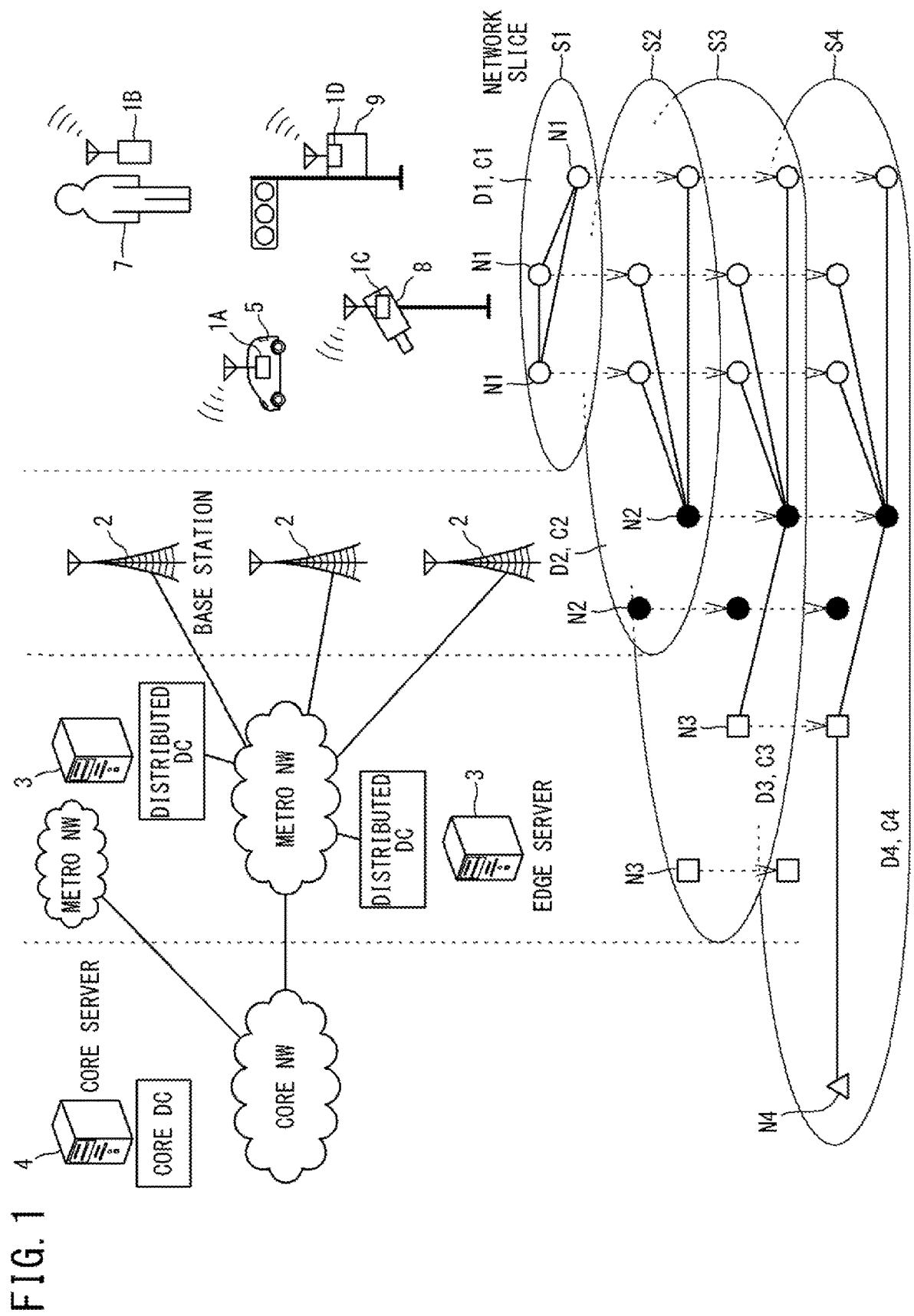
FIG. 1 is a diagram showing an overall configuration of a wireless communication system according to an embodiment of the present invention.

Problems to be Solved by the Present Disclosure

In the conventional traffic system described in PATENT LITERATURE 1, vehicle information is uplink-transmitted along a communication path of on-vehicle communication device→roadside communication device→central apparatus, and information regarding abnormal travel having the vehicle information as source data is downlink-transmitted along a communication path of central apparatus→roadside communication device→on-vehicle communication device.

Thus, the central apparatus generates information useful for driving support control, using the vehicle information transmitted by the on-vehicle communication device as an information source. However, there is a desire for a system that can perform appropriate information provision in real-time, to a mobile terminal, based on information collected from more information sources.

In view of the above conventional problem, an object of the present disclosure is to provide an information providing system and the like that can perform appropriate information provision to a mobile terminal.

Effects of the Present Disclosure

According to the present disclosure, appropriate information provision can be performed to a mobile terminal.

Outline of Embodiment of the Present Disclosure

Hereinafter, the outline of an embodiment of the present disclosure is listed and described.

(1) An information providing system of the present embodiment includes: one or a plurality of mobile terminals each configured to transmit first information based on own sensor information to a server; one or a plurality of fixed terminals each configured to transmit second information based on own sensor information to the server; and the server configured to generate third information on the basis of the first information and the second information that have been received by the server, and configured to transmit the generated third information to at least the mobile terminal.

According to the information providing system of the present embodiment, the server generates third information on the basis of the first information and the second information that have been received by the server, and transmits the generated third information to at least the mobile terminal. Therefore, it is possible to provide the mobile terminal with the third information that is generated on the basis of not only the first information derived from the mobile terminal but also the second information derived from the fixed terminal.

Thus, compared with a conventional system in which provision information is generated on the basis of only the first information derived from the mobile terminal, it is possible to perform appropriate information provision to the mobile terminal.

(2) Preferably, in the information providing system of the present embodiment, the mobile terminal generates the first information on the basis of the own sensor information and the third information that has been received by the mobile terminal.

(3) To be more specific, preferably, on the basis of the own sensor information and the third information that has been received by the mobile terminal, the mobile terminal detects an object of which state has changed, and sets change point information of the detected object, as the first information.

In this case, since the first information transmitted by the mobile terminal is composed of the change point information of the object, the communication load on the server can be reduced compared with that when the own sensor information is transmitted as is as the first information to the server.

(4) Preferably, in the information providing system of the present embodiment, the mobile terminal requests, for each predetermined cycle, the server for transmission of the third information, and when the mobile terminal has not detected the object of which state has changed in the predetermined cycle, the mobile terminal does not generate the first information.

Accordingly, compared with a case where the first information is generated irrespective of the presence/absence of change in the state and transmitted to the server, the communication load on the server can be reduced.

(5) Preferably, in the information providing system of the present embodiment, the first information and the second information each include identification information capable of determining accuracy of the sensor information, and when a position of an object included in each piece of different information having been received satisfies a predetermined condition, the server selects either one of the first information and the second information on the basis of the identification information, and generates the third information on the basis of the selected information.

Accordingly, even when received pieces of information regarding the same object conflict each other, the server can select the first information or the second information that is appropriate.

(6) Preferably, in the information providing system of the present embodiment, when the position of the object included in the first information and the position of the object included in the second information satisfy a predetermined condition, the server generates the third information on the basis of the second information.

The reason is as follows: since it is presumed that the second information having the fixed terminal as the information source has a higher accuracy than the first information having the mobile terminal as the information source, the third information should be generated on the basis of the second information.

(7) Preferably, in the information providing system of the present embodiment, the mobile terminal corrects the own sensor information on the basis of positional information of the object included in the third information.

Accordingly, the mobile terminal can improve the accuracy of its own sensor information.

(8) Preferably, in the information providing system of the present embodiment, the third information is dynamic information of an object to be superposed on map information.

In this case, dynamic information of the object superposed on the map information can be provided to the mobile terminal. This enables the mobile terminal to perform a collision avoidance process or the like by use of the dynamic information. Therefore, appropriate information provision can be performed to the mobile terminal.

(9) Preferably, in the information providing system of the present embodiment, the server includes a first server belonging to a first network slice having a shorter delay time period, and a second server belonging to a second network slice having a longer delay time period, and the first server determines a priority of each of the first information and the second information, and determines whether the first server generates the third information or the second server is caused to generate the third information, in accordance with the determined priorities.

Accordingly, the first server (for example, an edge server) can generate the third information on the basis of the first information having a higher priority, and the second server (for example, a core server) can generate the third information on the basis of the second information having a lower priority. As a result, the third information that has a higher priority can be provided earlier.

(10) Preferably, in the information providing system of the present embodiment, a transmission cycle of the third information by the first server is shorter than a transmission cycle of the third information by the second server.

The reason is as follows: since the delay time period of the first server is shorter than the delay time period of the second server, if the transmission cycle of the third information by the first server is shortened, the third information can be provided earlier.

(11) Preferably, in the information providing system of the present embodiment, when each priority satisfies a predetermined condition, the server notifies a transmission source of each of the first information and the second information, of an instruction for changing a transmission cycle of corresponding information.

Accordingly, the transmission cycles of the first information and the second information can be dynamically changed in accordance with the priorities.

(12) Preferably, in the information providing system of the present embodiment, when the first information and the second information each include image data and positional information of a detected object, the server accumulates, for each object, the first information and the second information each including the image data of the object.

Accordingly, by searching for the first information and the second information for each object (vehicle, pedestrian, or the like), it becomes possible to track the specific object in a time-series manner.

(13) Preferably, in the information providing system of the present embodiment, the server is capable of generating server prediction information as future dynamic information of an object, on the basis of the first information and the second information that have been received by the server, and the third information includes the generated server prediction information.

Accordingly, since the server prediction information, which is the future dynamic information of the object, is transmitted to at least the mobile terminal, the mobile terminal can perform a process such as a collision avoidance process using the received server prediction information.

(14) Preferably, in the information providing system of the present embodiment, the mobile terminal is capable of generating vehicle prediction information as future dynamic information of an object, on the basis of the third information that has been received by the mobile terminal.

Accordingly, since the mobile terminal generates the vehicle prediction information, which is the future dynamic information of the object, the mobile terminal can perform a process such as a collision avoidance process using the vehicle prediction information generated by the mobile terminal.

(15) Preferably, in the information providing system of the present embodiment, the mobile terminal causes the first information to include the vehicle prediction information generated by the mobile terminal.

Accordingly, the server can receive the vehicle prediction information. Thus, by comparing the received vehicle prediction information with the server prediction information generated by the server, the server can improve the accuracy of the server prediction information.

(16) Preferably, in the information providing system of the present embodiment, the mobile terminal corrects the vehicle prediction information generated by the mobile terminal, on the basis of the server prediction information that has been received by the mobile terminal.

Accordingly, the mobile terminal can improve the accuracy of the vehicle prediction information generated by the mobile terminal.

(17) Preferably, in the information providing system of the present embodiment, the server corrects the server prediction information generated by the server, on the basis of the vehicle prediction information that has been received by the server.

Accordingly, the server can improve the accuracy of the server prediction information generated by the server.

(18) Preferably, in the information providing system of the present embodiment, the mobile terminal is capable of generating vehicle prediction information as future dynamic information of an object, on the basis of the own sensor information, and causes the first information to include the generated vehicle prediction information.

Accordingly, the server can receive the vehicle prediction information. Thus, by receiving vehicle prediction information from a plurality of mobile terminals present in the service area of the server, the server can acquire prediction information in the service area, without performing the action prediction process.

(19) Preferably, in the information providing system of the present embodiment, the server includes a first server belonging to a first network slice having a shorter delay time period, and a second server belonging to a second network slice having a longer delay time period, and the server prediction information generated by the second server is dynamic information of a later time relative to that of the server prediction information generated by the first server.

In this case, if the action prediction in the future when the likelihood according to the edge server decreases is performed not by the edge server but by the core server which has higher performance, the likelihood in the action prediction can be improved.

(20) A server of the present embodiment relates to the server included in the information providing system according to (1) to (19) described above.

Therefore, the server of the present embodiment has actions and effects similar to those in the information providing system according to (1) to (19) described above.

(21) A mobile terminal of the present embodiment relates to the mobile terminal included in the information providing system according to (2) described above.

Therefore, the mobile terminal of the present embodiment exhibits actions and effects similar to those in the information providing system according to (2) described above.

(22) A computer program of the present embodiment relates to a computer program configured to cause a computer to function as the server included in the information providing system according to (1) to (19) described above.

Therefore, the computer program of the present embodiment exhibits actions and effects similar to those in the information providing system according to (1) to (19) described above.

(23) A computer program of the present embodiment relates to a computer program for causing a computer to function as a mobile terminal according to (2) described above.

Therefore, the computer program of the present embodiment exhibits actions and effects similar to those in the information providing system according to (2) described above.

DETAILS OF EMBODIMENT OF THE PRESENT DISCLOSURE

Hereinafter, details of an embodiment of the present disclosure will be described with reference to the drawings. It should be noted that at least some parts of the embodiment described below may be combined together as desired.

Overall Configuration of Wireless Communication System

FIG. 1 is diagram showing an overall configuration of a wireless communication system according to an embodiment of the present disclosure.

As shown in FIG. 1, a wireless communication system of the present embodiment includes: a plurality of communication terminals 1A to 1D which can perform wireless communication; one or a plurality of base stations 2 which perform wireless communication with the communication terminals 1A to 1D; one or a plurality of edge servers 3 which perform wired or wireless communication with the base stations 2; and one or a plurality of core servers 4 which perform wired or wireless communication with the edge servers 3.

Each core server 4 is installed in a core data center (DC) of a core network. Each edge server 3 is installed in a distributed data center (DC) of a metro network.

The metro network is a communication network constructed for each city, for example. The metro network in each city is connected to a core network.

Each base station 2 is communicably connected to an edge server 3 of the distributed data centers included in the metro network.

The core server 4 is communicably connected to the core network. Each edge server 3 is communicably connected to the metro network. Therefore, the core server 4 is communicable with the edge servers 3 and the base stations 2 belonging to the metro network of each city, via the core network and the metro network.

Each base station 2 is composed of at least one of a macrocell base station, a microcell base station, and a picocell base station.

In the wireless communication system of the present embodiment, the edge server 3 and the core server 4 are each implemented as a general-purpose server capable of providing SDN (Software-Defined Networking). The base station 2 and a relay apparatus (not shown) such as a repeater are each implemented as a transport device capable of providing SDN.

Therefore, due to network virtualization technology, a plurality of virtual networks (network slices) S1 to S4 that satisfy conflicting service requirements such as low delay communication and large-volume communication can be defined in physical devices of a wireless communication system.

The aforementioned network virtualization technology is a basic concept of "the 5th-generation mobile communication system" (hereinafter, abbreviated as "5G" (5th Generation)) of which standardization is in progress at present. Therefore, the wireless communication system of the present embodiment is realized as 5G, for example.

However, the wireless communication system of the present embodiment is not limited to 5G, and may be any mobile communication system that can define a plurality of network slices (hereinafter, also referred to as "slices") S1 to S4 in accordance with predetermined service requirements such as delay time period. The number of layers of slices to be defined is not limited to four, and may be five or greater.

In the example shown in FIG. 1, the network slices S1 to S4 are defined as follows.

The slice S1 is a network slice defined such that the communication terminals 1A to 1D directly communicate with one another. Each of the communication terminals 1A to 1D which directly communicate in the slice S1 is also referred to as a "node N1".

The slice S2 is a network slice defined such that the communication terminals 1A to 1D communicate with a base station 2. The highest-order communication node in the slice S2 (the base station 2 in the shown example) is also referred to as a "node N2".

The slice S3 is a network slice defined such that the communication terminals 1A to 1D communicate with an edge server 3 via the base station 2. The highest-order communication node in the slice S3 (the edge server 3 in the shown example) is also referred to as a "node N3".

In the slice S3, the node N2 serves as a relay node. That is, data communication is performed through an uplink path of the node N1→the node N2→the node N3 and a downlink path of the node N3→the node N2→the node N1.

The slice S4 is a network slice defined such that the communication terminals 1A to 1D communicate with a core server 4 via the base station 2 and the edge server 3. The highest-order communication node in the slice S4 (the core server 4 in the shown example) is also referred to as a "node N4".

In the slice S4, the node N2 and the node N3 serve as relay nodes. That is, data communication is performed through an uplink path of the node N1→the node N2→the node N3→the node N4 and a downlink path of the node N4→the node N3→the node N2→the node N1.

In the slice S4, routing in which the edge server 3 is not used as a relay node may be adopted. In this case, data communication is performed through an uplink path of the node N1→the node N2→the node N4 and a downlink path of the node N4→the node N2→the node N1.

In the slice S2, when a plurality of base stations 2 (node N2) are included, routing that includes communication between base stations 2, 2 is also possible.

Similarly, in the slice S3, when a plurality of edge servers 3 (node N3) are included, routing that includes communication between edge servers 3, 3 is also possible. In the slice S4, when a plurality of core servers 4 (node N4) are included, routing that includes communication between core servers 4, 4 is also possible.

The communication terminal 1A is implemented as a wireless communication device mounted to a vehicle 5. The vehicle 5 is not limited to an ordinary passenger car, but also includes public vehicles such as a fixed-route bus and an emergency vehicle. The vehicle 5 is not limited to a four-wheeled vehicle but may be a two-wheeled vehicle (motorcycle).

The drive type of the vehicle 5 may be any of engine drive, electric motor drive, and hybrid type. The driving method of the vehicle 5 may be any of ordinary driving in which an occupant performs operations such as acceleration and deceleration, steering, and the like, and automatic driving in which these operations are performed by software.

The communication terminal 1A of the vehicle 5 may be a wireless communication device already installed in the vehicle 5, or a portable terminal carried by an occupant in the vehicle 5.

The portable terminal of the occupant temporarily serves as an on-vehicle wireless communication device, by the portable terminal being connected to an in-vehicle LAN (Local Area Network) of the vehicle 5.

The communication terminal 1B is implemented as a portable terminal carried by a pedestrian 7. The pedestrian 7 is a person who moves on foot in an outdoor area such as a road or a parking area, and in an indoor area such as a building or an underground town. The pedestrian 7 includes not only a person who moves on foot but also a person who is riding on a bicycle or the like that does not have a power supply.

The communication terminal 1C is implemented as a wireless communication device mounted to a roadside sensor 8. The roadside sensor 8 is implemented as an imaging-type vehicle detector installed on a road, a security camera installed outdoors or indoors, or the like. The communication terminal 1D is implemented as a wireless communication device mounted to a traffic signal controller 9 at an intersection.

The service requirements of the slices S1 to S4 are as follows. Delay time periods D1 to D4 allowed for the respective slices S1 to S4 are defined such that $D1<D2<D3<D4$ is satisfied. For example, $D1=1$ ms, $D2=10$ ms, $D3=100$ ms, and $D4=1$ s.

Data communication traffics C1 to C4 per predetermined period (for example, one day) allowed for the respective slices S1 to S4 are defined such that $C1<C2<C3<C4$ is satisfied. For example, $C1=20$ GB, $C2=100$ GB, $C3=2$ TB, and $C4=10$ TB.

As described above, in the wireless communication system shown in FIG. 1, direct wireless communication (for example, "vehicle-to-vehicle communication" in which the communication terminals 1A of vehicles 5 perform direct communication with one another) in the slice S1 and wireless communication in the slice S2 via a base station 2 can be performed.

However, the present embodiment assumes an information providing service to users included in a relatively wide service area (for example, an area encompassing cities, towns, villages, or prefectures) using the slice S3 and the slice S4 in the wireless communication system shown in FIG. 1.

Internal Configuration of Edge Server and Core Server

Figure 2:
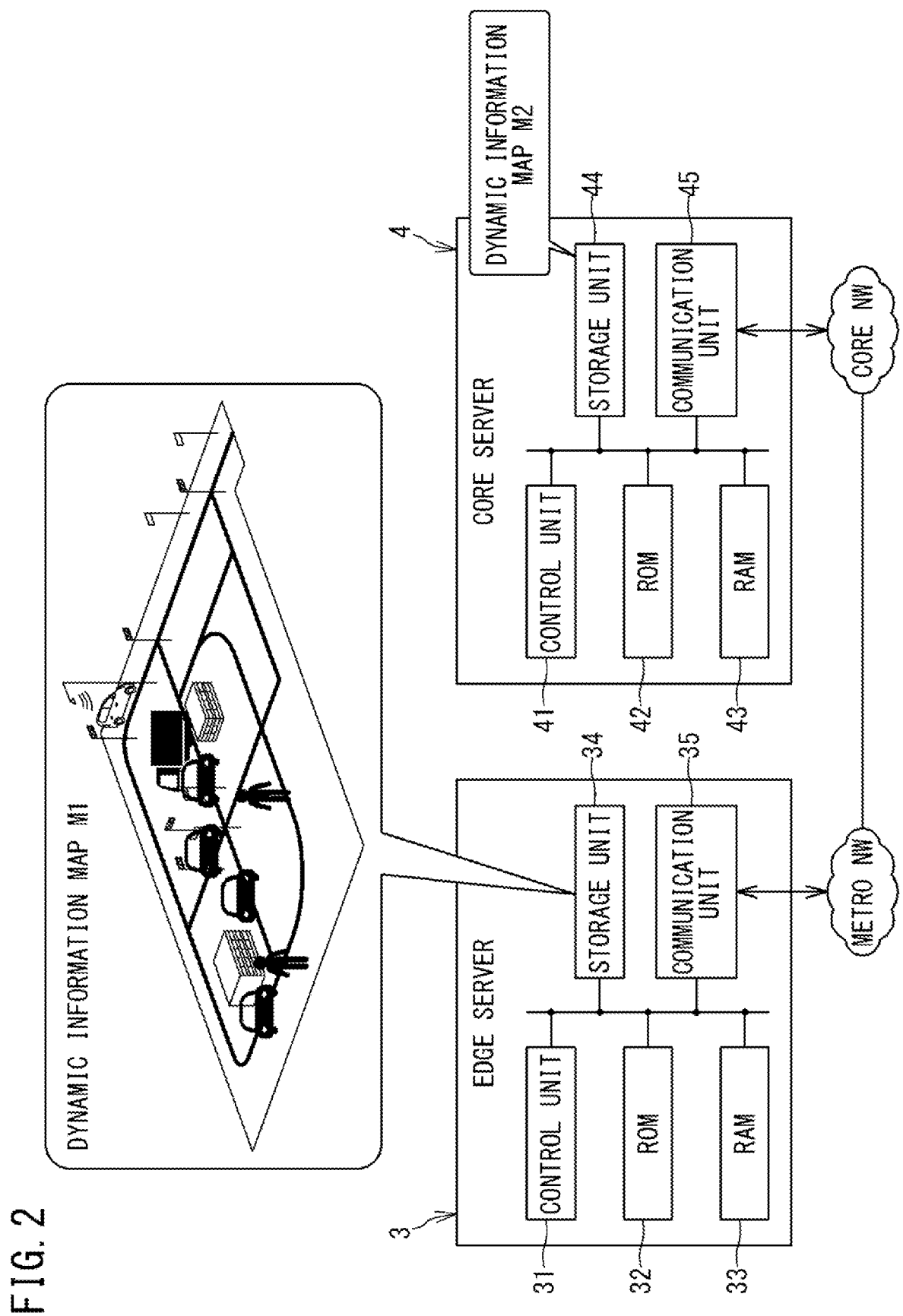
FIG. 2 is a block diagram showing one example of internal configurations of an edge server and a core server.

FIG. 2 is a block diagram showing one example of internal configurations of an edge server 3 and a core server 4.

As shown in FIG. 2, the edge server 3 includes: a control unit 31 including a CPU (Central Processing Unit) and the like; a ROM (Read Only Memory) 32; a RAM (Random Access Memory) 33; a storage unit 34; a communication unit 35; and the like.

The control unit 31 controls the operation of each piece of hardware by reading out, to the RAM 33, one or a plurality of programs previously stored in the ROM 32 and performing the programs, thereby causing a computer apparatus to function as an edge server communicable with the core server 4, the base station 2, and the like.

The RAM 33 is implemented as a volatile memory element such as an SRAM (Static RAM) or a DRAM (Dynamic RAM), and temporarily stores therein programs performed by the control unit 31 and data necessary for performing the programs.

The storage unit 34 is implemented as a nonvolatile memory element such as a flash memory or an EEPROM (Electrically Erasable Programmable Read Only Memory), or a magnetic storage device or the like such as a hard disk or the like.

The communication unit 35 is implemented as a communication device that performs a 5G-supporting communication process, and communicates with the core server 4, the base station 2, and the like via the metro network. The communication unit 35 transmits information provided from the control unit 31, to an external apparatus via the metro network, and provides information received via the metro network, to the control unit 31.

As shown in FIG. 2, the storage unit 34 of the edge server 3 has stored therein a dynamic information map (hereinafter, also simply referred to as "map") M1.

The map M1 is an assembly of data (virtual database) obtained by superposing dynamic information which changes every moment, on a high-definition digital map which is static information. Digital information forming the map M1 includes "dynamic information", "semi-dynamic information", "semi-static information", and "static information" described below.

"Dynamic information" (up to 1 second) is dynamic data which is required to have a delay time period within 1 second. For example, positional information of a mobile body (vehicle, pedestrian, etc.), signal information, and the like, which are utilized as ITS (Intelligent Transport Systems) look-ahead information, correspond to the dynamic information.

"Semi-dynamic information" (up to 1 minute) is semi-dynamic data which is required to have a delay time period within 1 minute. For example, accident information, congestion information, narrow area weather information, and the like correspond to the semi-dynamic information.

"Semi-static information" (up to 1 hour) is semi-static data which is allowed to have a delay time period within 1 hour. For example, traffic restriction information, road construction information, wide area weather information, and the like correspond to the semi-static information.

"Static information" (up to 1 month) is static data which is allowed to have a delay time period within 1 month. For example, road surface information, traffic lane information, three-dimensional structure data, and the like correspond to the static information.

The control unit 31 of the edge server 3 updates the dynamic information of the map M1 stored in the storage unit 34 for each predetermined update cycle (dynamic information update process).

Specifically, the control unit 31 collects, for each predetermined update cycle, various types of sensor information measured by vehicles 5, roadside sensors 8, and the like in the service area of the edge server 3, from the 5G-supporting communication terminals 1A to 1D, and updates the dynamic information of the map M1 on the basis of the collected sensor information.

When the control unit 31 has received a request message for dynamic information from the communication terminal 1A, 1B of a certain user, the control unit 31 delivers, for each predetermined delivery cycle, the latest dynamic information to the communication terminal 1A, 1B, which is the transmission source of the request message (dynamic information delivery process).

The control unit 31 collects traffic information and weather information of various places in the service area, from traffic control centers, private meteorological service support centers, and the like, and updates the semi-dynamic information and the semi-static information of the map M1 on the basis of the collected information.

As shown in FIG. 2, the core server 4 includes: a control unit 41 including a CPU and the like; a ROM 42, a RAM 43, a storage unit 44, a communication unit 45, and the like.

The control unit 41 controls the operation of each piece of hardware by reading out, to the RAM 43, one or a plurality of programs previously stored in the ROM 32 and performing the programs, thereby causing a computer apparatus to function as a core server 4 communicable with the edge server 3.

The RAM 43 is implemented as a volatile memory element such as an SRAM or a DRAM, and temporarily stores therein programs performed by the control unit 41 and data necessary for performing the programs.

The storage unit 44 is implemented as a nonvolatile memory element such as a flash memory or an EEPROM, or a magnetic storage device or the like such as a hard disk.

The communication unit 45 is implemented as a communication device that performs a 5G-supporting communication process, and communicates with the edge server 3, the base station 2, and the like via the core network. The communication unit 45 transmits information provided from the control unit 41, to an external apparatus via the core network, and provides information received via the core network, to the control unit 41.

As shown in FIG. 2, the storage unit 44 of the core server 4 has stored therein a dynamic information map M2.

The data structure of the map M2 (data structure including dynamic information, semi-dynamic information, semi-static information, and static information) is similar to that of the map M1. The map M2 may be a map of the same service area as that of the map M1 of a specific edge server 3, or may be a map of a wider area obtained by integrating the maps M1 held by a plurality of edge servers 3.

As in the case of the edge server 3, the control unit 41 of the core server 4 can perform a dynamic information update process of updating the dynamic information of the map M2 stored in the storage unit 44, and a dynamic information delivery process of delivering the dynamic information in response to a request message.

That is, the control unit 41 can perform a dynamic information update process and a dynamic information delivery process on the basis of the map M2 of the core server 4, independently of the edge server 3.

However, the core server 4, which belongs to the slice S4, has a longer communication delay time period with the communication terminal 1A to 1D, compared with the edge server 3, which belongs to the slice S3.

Therefore, even if the core server 4 independently updates the dynamic information of the map M2, the dynamic information of the map M2 is older than the dynamic information of the map M1 managed by the edge server 3. Therefore, it is preferable that the control unit 31 of the edge server 3 and the control unit 41 of the core server 4 perform the dynamic information update process and the dynamic information delivery process in a distributed manner, in accordance with the priority defined for each predetermined area, for example.

The control unit 41 collects traffic information and weather information of various places in the service area, from traffic control centers, private meteorological service support centers, and the like, and updates the semi-dynamic information and the semi-static information of the map M2 on the basis of the collected information.

The control unit 41 may employ the semi-dynamic information and the semi-static information of the map M1 received from the edge server 3, as the semi-dynamic information and the semi-static information of the map M2 of the core server 4.

Internal Configuration of On-Vehicle Apparatus

Figure 3:
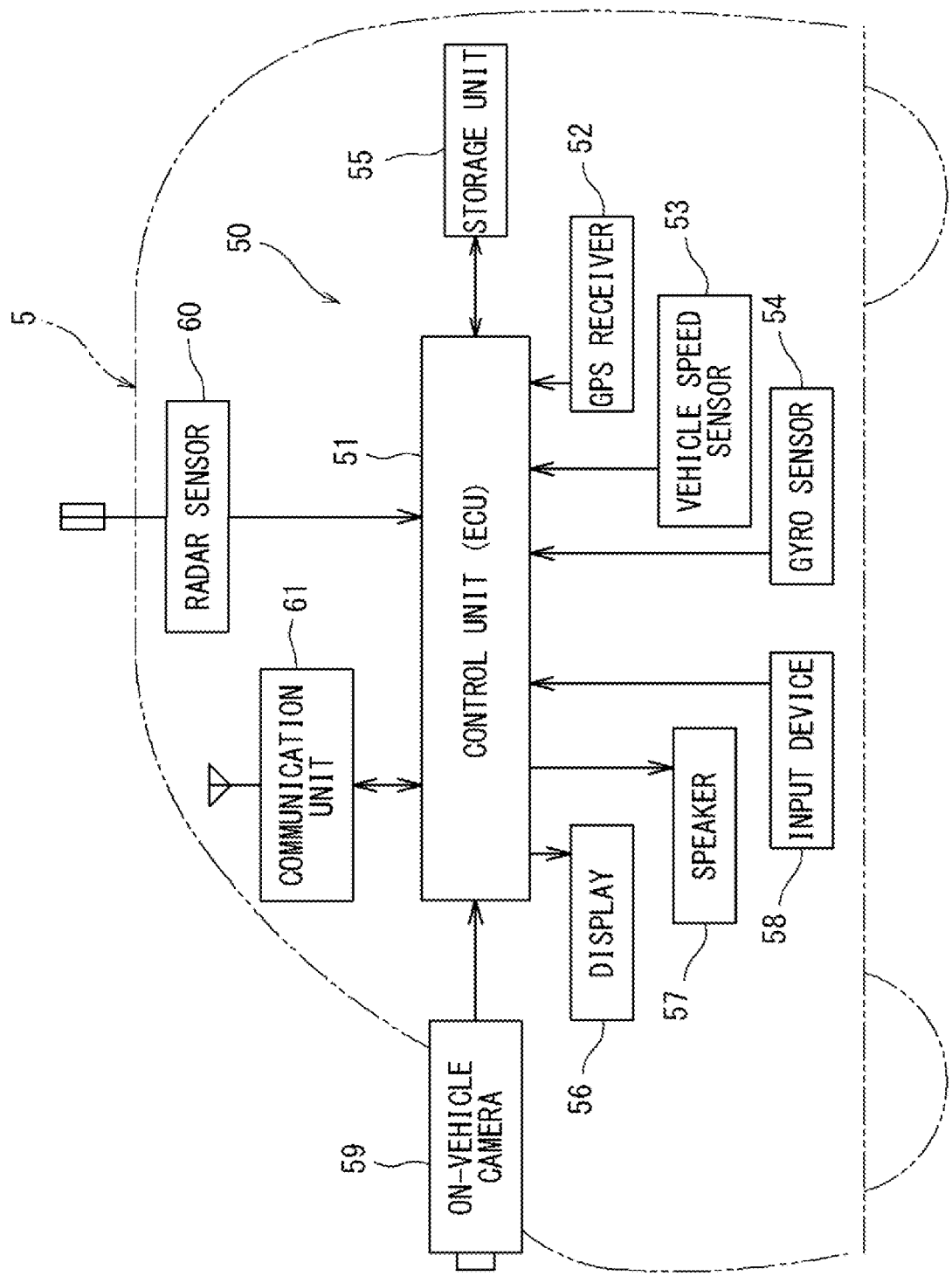
FIG. 3 is a block diagram showing one example of an internal configuration of an on-vehicle apparatus.

FIG. 3 is a block diagram showing one example of an internal configuration of an on-vehicle apparatus 50.

As shown in FIG. 3, the on-vehicle apparatus 50 of the vehicle 5 includes a control unit (ECU: Electronic Control unit) 51, a GPS receiver 52, a vehicle speed sensor 53, a gyro sensor 54, a storage unit 55, a display 56, a speaker 57, an input device 58, an on-vehicle camera 59, a radar sensor 60, a communication unit 61, and the like.

The communication unit 61 is implemented as the communication terminal 1A described above, i.e., a wireless communication device capable of performing a 5G-supporting communication process, for example.

Therefore, the vehicle 5 can communicate with the edge server 3, as one kind of mobile terminal belonging to the slice S3. The vehicle 5 can also communicate with the core server 4, as one kind of mobile terminal belonging to the slice S4.

The control unit 51 is a computer device that performs route search for the vehicle 5, control of other electronic devices 52 to 61, and the like. The control unit 51 obtains the vehicle position of the vehicle 5 on the basis of a GPS signal periodically acquired by the GPS receiver 52.

The control unit 51 complements the vehicle position and the azimuth on the basis of input signals of the vehicle speed sensor 53 and the gyro sensor 54, and grasps the accurate present position and azimuth of the vehicle 5.

The GPS receiver 52, the vehicle speed sensor 53, and the gyro sensor 54 are sensors that measure the present position, the speed, and the orientation of the vehicle 5.

The storage unit 55 includes a map database. The map database provides road map data to the control unit 51. The road map data includes link data and node data, and is stored in a recording medium such as a DVD, a CD-ROM, a memory card, or a HDD. The storage unit 55 reads out necessary road map data from the recording medium and provides the road map data to the control unit 51.

The display 56 and the speaker 57 are output devices for notifying the user, who is the occupant of the vehicle 5, various types of information generated by the control unit 51.

Specifically, the display 56 displays an input screen to be used in route search, a map image around the vehicle 5, route information up to a destination, and the like. The speaker 57 outputs, by sound, announcement and the like for guiding the vehicle 5 to the destination. These output devices can also notify the occupant of provision information received by the communication unit 61.

The input device 58 is a device with which the occupant of the vehicle 5 performs various input operations. The input device 58 is implemented as a combination of an operation switch and a joystick provided at the steering wheel, a touch panel provided at the display 56, and the like.

A speech recognition device which receives an input through speech recognition of the occupant can also be used as the input device 58. The input signal generated by the input device 58 is transmitted to the control unit 51.

The on-vehicle camera 59 is implemented as an image sensor that captures a picture of an area in front of the vehicle 5. The on-vehicle camera 59 may be of either a monocular type or a compound-eye type. The radar sensor 60 is implemented as a sensor that detects an object present in front of or around the vehicle 5, by a millimeter-wave radar, a LiDAR method, or the like.

On the basis of the measurement data from the on-vehicle camera 59 and the radar sensor 60, the control unit 51 can perform driving support control such as: causing the display 56 to output an alert to the occupant who is driving; or executing forced brake intervention.

The control unit 51 is implemented as an arithmetic processing unit, such as a microcomputer, which performs various control programs stored in the storage unit 55.

By executing the above control programs, the control unit 51 can perform various navigation functions, such as a function of causing the display 56 to display a map image, a function of calculating a route (including the position of a relay point if there is any) from the start place to the destination, and a function of guiding the vehicle 5 to the destination along the calculated route.

On the basis of at least one measurement data obtained from the on-vehicle camera 59 and the radar sensor 60, the control unit 51 can perform an object recognition process of recognizing an object in front of or around the vehicle 5, and a distance measuring process of calculating the distance to the recognized object.

The control unit 51 can calculate the positional information of the object recognized through the object recognition process, on the basis of the distance calculated through the distance measuring process and the sensor position of the vehicle 5.

The control unit 51 can perform the following processes in the communication with the edge server 3 (or core server 4).

1) Request message transmitting process
2) Dynamic information receiving process
3) Change point information calculating process
4) Change point information transmitting process The request message transmitting process is a process of transmitting, to the edge server 3, a control packet which requests delivery of the dynamic information of the map M1 which is sequentially updated by the edge server 3. The control packet includes a vehicle ID of the vehicle 5.

When the edge server 3 has received a request message that includes a predetermined vehicle ID, the edge server 3 delivers, in a predetermined delivery cycle, the dynamic information to the communication terminal 1A of the vehicle 5 that has the vehicle ID of the transmission source.

The dynamic information receiving process is a process of receiving the dynamic information delivered to the on-vehicle apparatus 50 by the edge server 3.

The change point information calculating process performed in the vehicle 5 is a process in which: the received dynamic information and the sensor information of the vehicle 5 at the time of the reception thereof are compared with each other; and the change amount therebetween is calculated on the basis of the result of the comparison. As the change point information calculated in the vehicle 5, the following information examples a1 and a2 are conceivable, for example.

Information example a1: change point information regarding a recognized object In a case where no object X (vehicle, pedestrian, obstacle, or the like) is included in the received dynamic information but an object X has been detected through the object recognition process performed by the control unit 51, the control unit 51 sets the image data and the positional information of the detected object X, as the change point information.

In a case where the positional information of an object X included in the received dynamic information and the positional information of the object X obtained through the object recognition process performed by the control unit 51 are deviated from each other by a predetermined threshold or more, the control unit 51 sets the image data of the detected object X and the difference value between these pieces of positional information, as the change point information.

Information example a2: change point information regarding the vehicle 5

In a case where the positional information of the vehicle 5 included in the received dynamic information and the vehicle position of the vehicle 5 calculated by the control unit 51 on the basis of the GPS signal are deviated from each other by a predetermined threshold or more, the control unit 51 sets the difference value therebetween, as the change point information.

In a case where the azimuth of the vehicle 5 included in the received dynamic information and the azimuth of the vehicle 5 calculated by the control unit 51 on the basis of the measurement data by the gyro sensor 54 are deviated by a predetermined threshold or more, the control unit 51 sets the difference value therebetween, as the change point information.

When the control unit 51 has calculated the change point information as described above, the control unit 51 generates a communication packet addressed to the edge server 3 and including the calculated change point information. The control unit 51 causes the vehicle ID of the vehicle 5 to be included in the communication packet.

The change point information transmitting process is a process of transmitting, to the edge server 3, the above-described communication packet having the change point information included in the data. The change point information transmitting process is performed in the cycle of dynamic information delivery performed by the edge server 3.

The control unit 51 can also perform, on the basis of the dynamic information received from the edge server 3 or the like, driving support control such as: causing the display 56 to output an alert to the occupant who is driving; or executing forced brake intervention.

Internal Configuration of Pedestrian Terminal

Figure 4:
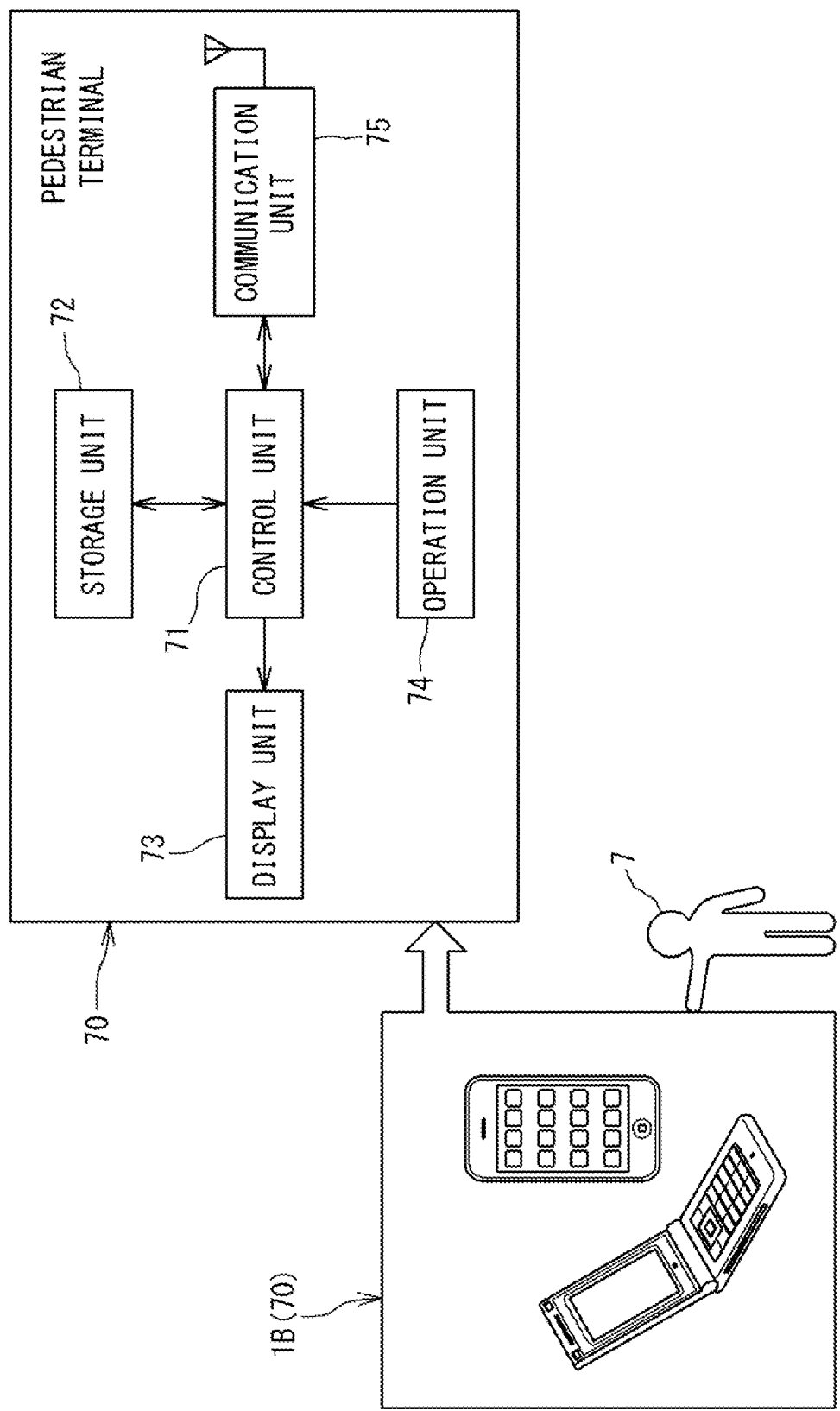
FIG. 4 is a block diagram showing one example of an internal configuration of a pedestrian terminal.

FIG. 4 is a block diagram showing one example of an internal configuration of a pedestrian terminal 70.

The pedestrian terminal 70 shown in FIG. 4 is implemented as the communication terminal 1B described above, i.e., a wireless communication device capable of performing a 5G-supporting communication process, for example.

Therefore, the pedestrian terminal 70 can communicate with the edge server 3, as one kind of mobile terminal belonging to the slice S3. The pedestrian terminal 70 can also communicate with the core server 4, as one kind of mobile terminal belonging to the slice S4.

As shown in FIG. 4, the pedestrian terminal 70 includes a control unit 71, a storage unit 72, a display unit 73, an operation unit 74, and a communication unit 75.

The communication unit 75 is implemented as a communication interface which performs wireless communication with the base station 2 of a carrier that provides 5G services. The communication unit 75 converts an RF signal from the base station 2 into a digital signal to output the digital signal to the control unit 71, and converts a digital signal inputted from the control unit 71 into an RF signal to transmit the RF signal to the base station 2.

The control unit 71 includes a CPU, a ROM, a RAM, and the like. The control unit 71 reads out programs stored in the storage unit 72 and performs the programs, thereby controlling the overall operation of the pedestrian terminal 70.

The storage unit 72 is implemented as a hard disk, a nonvolatile memory, or the like, and has stored therein various computer programs and data. The storage unit 72 has stored therein a portable-terminal ID, which is identification information of the pedestrian terminal 70. The portable-terminal ID is composed of, for example, a user ID, a MAC address, and the like which are unique to the carrier contractor.

The storage unit 72 has stored therein various types of application software arbitrarily installed by the user.

The application software includes application software for enjoying information providing services of receiving the dynamic information of the map M1 through 5G communication with the edge server 3 (or core server 4), for example.

The operation unit 74 is configured by various operation buttons and a touch panel function of the display unit 73. The operation unit 74 outputs, to the control unit 71, an operation signal in accordance with an operation performed by the user.

The display unit 73 is implemented as a liquid crystal display, for example, and presents various types of information to the user. For example, the display unit 73 which can display image data of the dynamic information map M1, M2 transmitted from the server 3, 4, on the screen.

The control unit 71 also has a time synchronization function of acquiring the present time from a GPS signal, a position detection function of measuring the present position (latitude, longitude, and altitude) of the pedestrian terminal from the GPS signal, an azimuth detection function of measuring the orientation of the pedestrian 7 by an azimuth sensor, and the like.

The control unit 71 can perform the following processes in the communication with the edge server 3 (or core server 4).

1) Request message transmitting process
2) Terminal state information transmitting process
3) Dynamic information receiving process The request message transmitting process is a process of transmitting, to the edge server 3, a control packet which requests delivery of the dynamic information of the map M1 which is sequentially updated by the edge server 3. The control packet includes a portable-terminal ID of the pedestrian terminal 70.

When the edge server 3 has received a request message that includes a predetermined portable-terminal ID, the edge server 3 delivers, in a predetermined delivery cycle, the dynamic information to the communication terminal 1B, of the pedestrian 7, that has the portable-terminal ID of the transmission source.

The terminal state information transmitting process is a process of transmitting, to the edge server 3, state information of the pedestrian terminal 70 such as the position and azimuth information of the pedestrian terminal 70. The terminal state information may include identification information that indicates whether or not the terminal is displaying application software, such as a map application, a mail application, or a game application, that could easily cause a so-called "texting while walking" state.

The dynamic information receiving process is a process of receiving the dynamic information delivered to the pedestrian terminal 70 by the edge server 3.

Internal Configuration of Roadside Sensor

Figure 5:
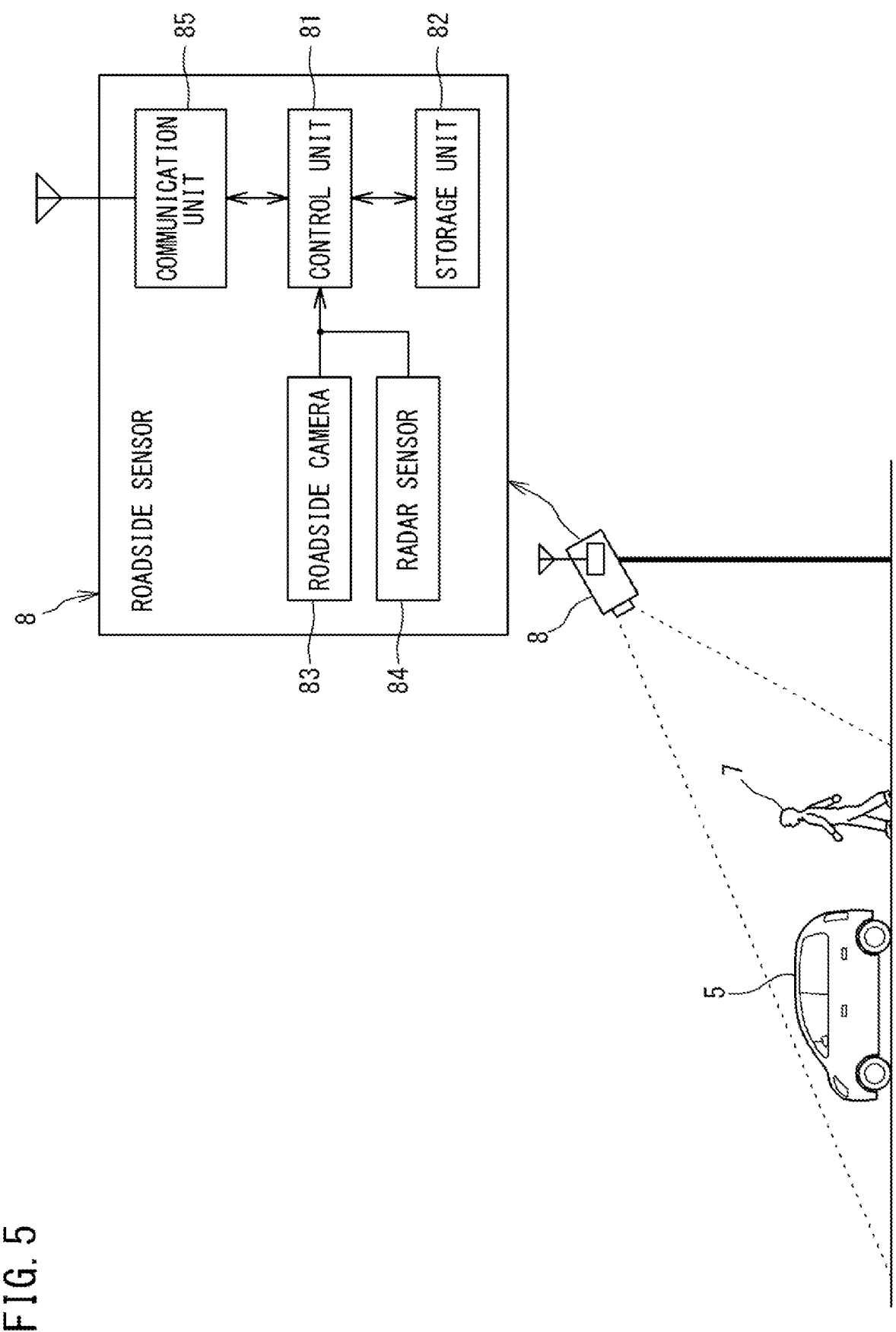
FIG. 5 is a block diagram showing one example of an internal configuration of a roadside sensor.

FIG. 5 is a block diagram showing one example of an internal configuration of a roadside sensor 8.

As shown in FIG. 5, the roadside sensor 8 includes a control unit 81, a storage unit 82, a roadside camera 83, a radar sensor 84, and a communication unit 85.

The communication unit 85 is implemented as the communication terminal 1C described above, i.e., a wireless communication device capable of performing a 5G-supporting communication process, for example.

Therefore, the roadside sensor 8 can communicate with the edge server 3, as one kind of fixed terminal belonging to the slice S3. The roadside sensor 8 can also communicate with the core server 4 as one kind of fixed terminal belonging to the slice S4.

The control unit 81 includes a CPU, a ROM, a RAM, and the like. The control unit 81 reads out programs stored in the storage unit 82 and performs the programs, thereby controlling the overall operation of the roadside sensor 8.

The storage unit 82 is implemented as a hard disk, a nonvolatile memory, or the like, and has stored therein various computer programs and data. The storage unit 82 has stored therein a sensor ID, which is identification information of the roadside sensor 8. The sensor ID is composed of, for example, a user ID, a MAC address, and the like which are unique to the owner of the roadside sensor 8.

The roadside camera 83 is implemented as an image sensor that captures a picture of a predetermined shooting area. The roadside camera 83 may be of either a monocular type or a compound-eye type. The radar sensor 60 is implemented as a sensor that detects an object present in front of or around the vehicle 5, by a millimeter-wave radar, a LiDAR method, or the like.

In a case where the roadside sensor 8 is a security camera, the control unit 81 transmits the captured picture data and the like to a computer apparatus of a security manager. In a case where the roadside sensor 8 is an imaging-type vehicle detector, the control unit 81 transmits the captured picture data and the like to a traffic control center.

On the basis of at least one measurement data obtained from the roadside camera 83 and the radar sensor 84, the control unit 81 can perform an object recognition process of recognizing an object in the shooting area, and a distance measuring process of calculating the distance to the recognition object.

The control unit 81 can calculate the positional information of the object recognized through the object recognition process, on the basis of the distance calculated through the distance measuring process and the sensor position of the roadside sensor.

The control unit 81 can perform the following processes in the communication with the edge server 3 (or core server 4).

1) Change point information calculating process
2) Change point information transmitting process The change point information calculating process performed in the roadside sensor 8 is a process in which: the immediately-preceding sensor information and the present sensor information are compared with each other in each predetermined measurement cycle (for example, the cycle of dynamic information delivery performed by the edge server 3); and the change amount therebetween is calculated on the basis of the result of the comparison. As the change point information calculated in the roadside sensor 8, the following information example b1 is conceivable, for example.

Information example b1: change point information regarding a recognized object

In a case where no object Y (vehicle, pedestrian, obstacle, or the like) has been detected in the immediately-preceding object recognition process but an object Y has been detected in the present object recognition process, the control unit 81 sets the image data and the positional information of the detected object Y, as the change point information.

In a case where the positional information of an object Y obtained through the immediately-preceding object recognition process and the positional information of the object Y obtained through the present object recognition process are deviated from each other by a predetermined threshold or more, the control unit 81 sets the positional information of the detected object Y and the difference value therebetween, as the change point information.

When the control unit 81 has calculated the change point information as described above, the control unit 81 generates a communication packet addressed to the edge server 3 and including the calculated change point information. The control unit 81 causes the sensor ID of the roadside sensor 8 to be included in the communication packet.

The change point information transmitting process is a process of transmitting, to the edge server 3, the above-described communication packet having the change point information included in the data. The change point information transmitting process is performed in the cycle of dynamic information delivery performed by the edge server 3.

Overall Configuration of Information Providing System

Figure 6:
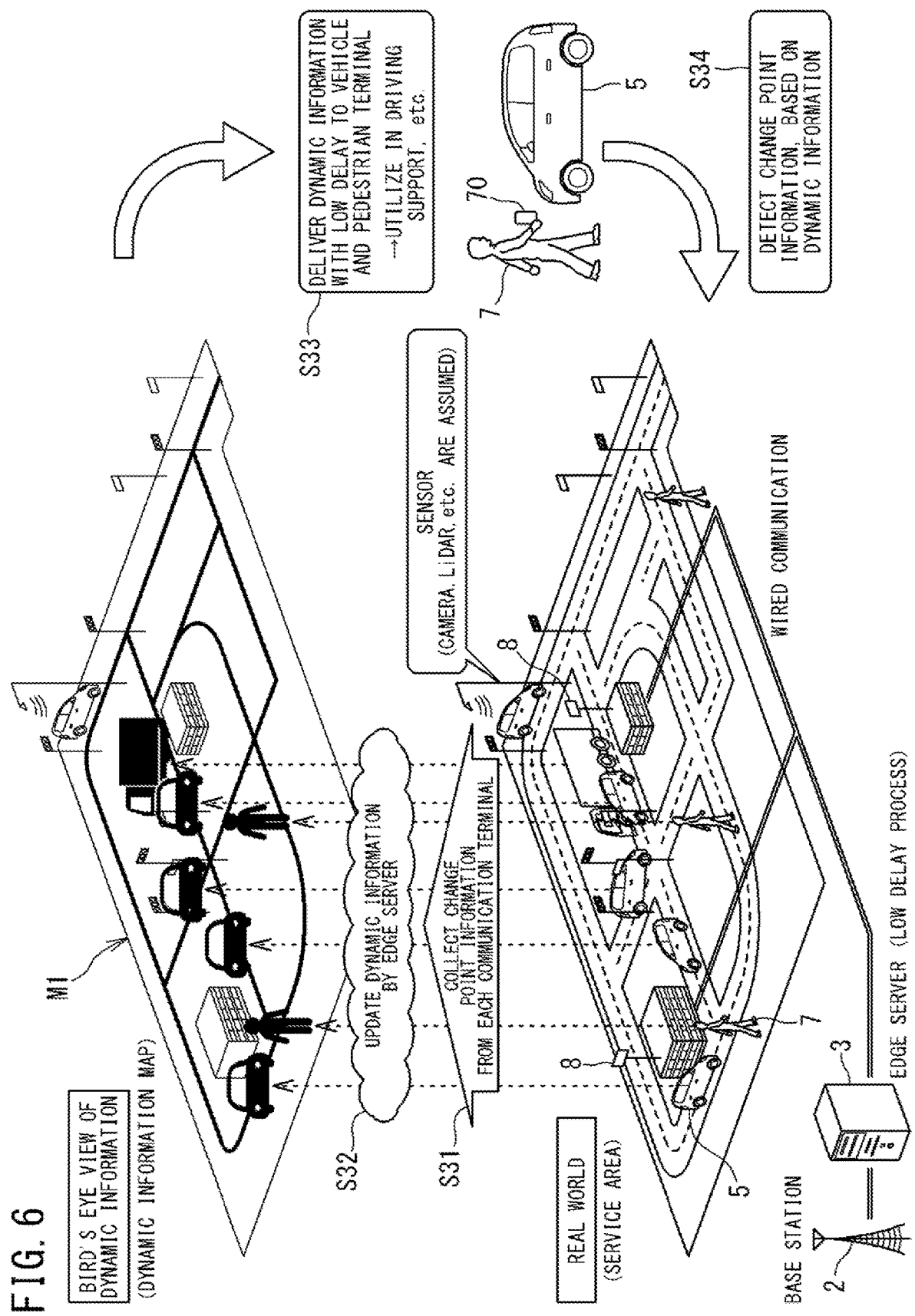
FIG. 6 is a diagram showing an overall configuration of an information providing system according to the embodiment of the present invention.

FIG. 6 is a diagram showing an overall configuration of an information providing system according to the embodiment of the present disclosure.

As shown in FIG. 6, the information providing system of the present embodiment includes: a large number of vehicles 5, pedestrian terminals 70, and roadside sensors 8 which are present in a relatively-wide-range service area (real world) of an edge server 3; and the edge server 3 capable of performing low-delay wireless communication through 5G communication or the like via these communication nodes and a base station 2.

The edge server 3 collects the above-described change point information in a predetermined cycle from the vehicles 5, the roadside sensors 8, and the like (step S31); and integrates the collected change point information through map matching to update the dynamic information of the dynamic information map M1 being managed by the edge server 3 (step S32).

If the edge server 3 receives a request from a vehicle 5 or a pedestrian terminal 70, the edge server 3 transmits the latest dynamic information to the request-source communication node (step S33). Accordingly, for example, the vehicle 5 that has received the dynamic information can utilize the dynamic information in the driving support for the occupant, or the like.

When the vehicle 5 having received the dynamic information has detected change point information relative to the sensor information of the vehicle 5 on the basis of the dynamic information, the vehicle 5 transmits the detected change point information to the edge server 3 (step S34).

Thus, in the information providing system of the present embodiment, the information processing at the communication nodes circulate in the order of: collection of change point information (step S31)→update of dynamic information (step S32)→delivery of dynamic information (step S33)→detection of change point information by vehicle (step S34)→collection of change point information (step S31).

FIG. 6 shows an example of an information providing system that includes a single edge server 3, but a plurality of edge servers 3 may be included. Instead of or in addition to the edge server 3, one or a plurality of core servers 4 may be included.

The dynamic information map M1 managed by the edge server 3 may be any map as long as at least dynamic information of objects are superposed on map information such as a digital map. This also applies to the dynamic information map M2 of the core server.

Dynamic Information Update Process and Dynamic Information Delivery Process

Figure 7:
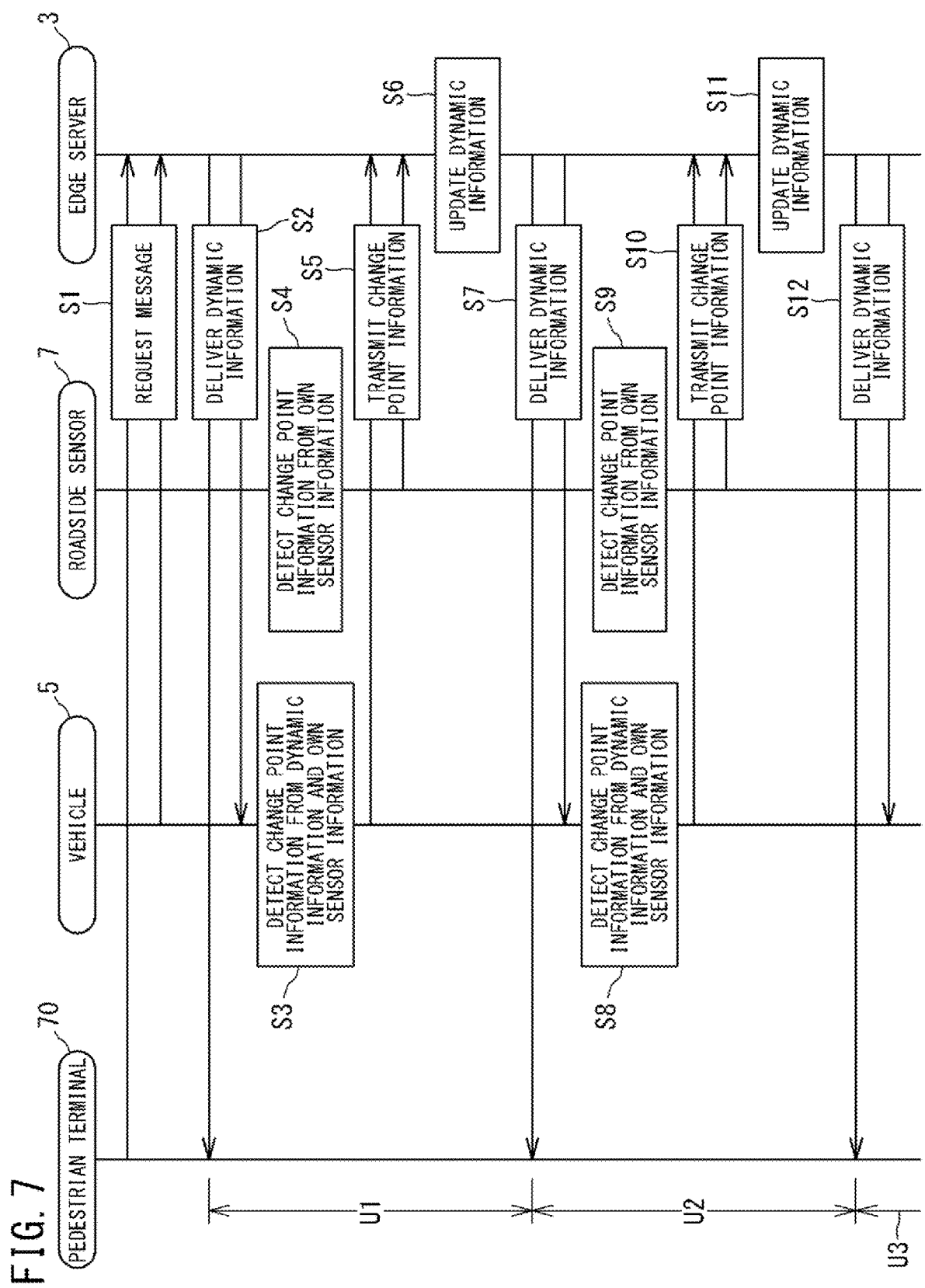
FIG. 7 is a sequence diagram showing one example of a dynamic information update process and a dynamic information delivery process.

FIG. 7 is a sequence diagram showing one example of a dynamic information update process and a dynamic information delivery process performed through cooperation between a pedestrian terminal 70, a vehicle 5, a roadside sensor 8, and an edge server 3.

In the description below, the execution bodies are a pedestrian terminal 70, a vehicle 5, a roadside sensor 8, and an edge server 3, but the actual execution bodies are the control units 71, 51, 81, and 31 thereof. U1, U2, ... in FIG. 7 are dynamic information delivery cycles.

As shown in FIG. 7, when the edge server 3 has received a request message for dynamic information from each of the pedestrian terminal 70 and the vehicle 5 (step S1), the edge server 3 delivers the latest dynamic information at the time of the reception to the pedestrian terminal 70 and the vehicle 5 which are the transmission sources (step S2).

In step S1, when the request message has been sent from either one of the pedestrian terminal 70 and the vehicle 5, the dynamic information is delivered, in step S2, only to the communication terminal that is the transmission source of the request message.

When the vehicle 5 having received the dynamic information in step S2 has detected change point information on the basis of the result of comparison between the dynamic information and the sensor information of the vehicle 5 itself within a delivery cycle U1 (step S3), the vehicle 5 transmits the detected change point information to the edge server 3 (step S5).

When the roadside sensor 8 has detected change point information of the sensor information of the roadside sensor 8 itself within the delivery cycle U1, the roadside sensor 8 transmits the detected change point information to the edge server 3 (step S5).

When the edge server 3 has received the change point information from the vehicle 5 and the roadside sensor 8 within the delivery cycle U1, the edge server 3 updates the dynamic information so as to reflect these pieces of change point information (step S6), and then, delivers the updated dynamic information to the pedestrian terminal 70 and the vehicle 5 (step S7).

In a case where only the vehicle 5 has detected change point information within the delivery cycle U1, only the change point information detected by the vehicle 5 in step S3 is transmitted to the edge server 3 (step S5), and the update of the dynamic information is performed so as to reflect the change point information only (step S6).

In a case where only the roadside sensor 8 has detected change point information within the delivery cycle U1, only the change point information detected by the roadside sensor 8 in step S4 is transmitted to the edge server 3 (step S5), and the update of the dynamic information is performed so as to reflect the change point information only (step S6).

In a case where neither the vehicle 5 nor the roadside sensor 8 has detected change point information within the delivery cycle U1, the processes of steps S3 to S6 are not performed, and the dynamic information, which is identical to the dynamic information in the immediately-preceding transmission (step S2), is delivered to the pedestrian terminal 70 and the vehicle 5 (step S7).

When the vehicle 5 having received the dynamic information in step S7 has detected change point information on the basis of the result of comparison between the dynamic information and the sensor information of the vehicle 5 itself within a delivery cycle U2 (step S8), the vehicle 5 transmits the detected change point information to the edge server 3 (step S10).

When the roadside sensor 8 has detected change point information of the sensor information of the roadside sensor 8 itself within the delivery cycle U2, the roadside sensor 8 transmits the detected change point information to the edge server 3 (step S10).

When the edge server 3 has received the change point information from the vehicle 5 and the roadside sensor 8 within the delivery cycle U2, the edge server 3 updates the dynamic information so as to reflect these pieces of change point information (step S11), and then, delivers the updated dynamic information to the pedestrian terminal 70 and the vehicle 5 (step S12).

In a case where only the vehicle 5 has detected change point information within the delivery cycle U2, only the change point information detected by the vehicle 5 in step S8 is transmitted to the edge server 3 (step S10), and the update of the dynamic information is performed so as to reflect the change point information only (step S11).

In a case where only the roadside sensor 8 has detected change point information within the delivery cycle U2, only the change point information detected by the roadside sensor 8 in step S9 is transmitted to the edge server 3 (step S10), and the update of the dynamic information is performed so as to reflect the change point information only (step S11).

In a case where neither the vehicle 5 nor the roadside sensor 8 has detected change point information within the delivery cycle U2, the processes of steps S8 to S11 are not performed, and the dynamic information, which is identical to the dynamic information in the immediately-preceding transmission (step S7), is delivered to the pedestrian terminal 70 and the vehicle 5 (step S12).

Then, until a request message to stop the delivery of the dynamic information is received from both of the pedestrian terminal 70 and the vehicle 5, or until communication with the pedestrian terminal 70 and the vehicle 5 is disconnected, the sequence similar to that described above is repeated.

Selection Method in the Case of Conflicting Change Point Information

Figure 8:
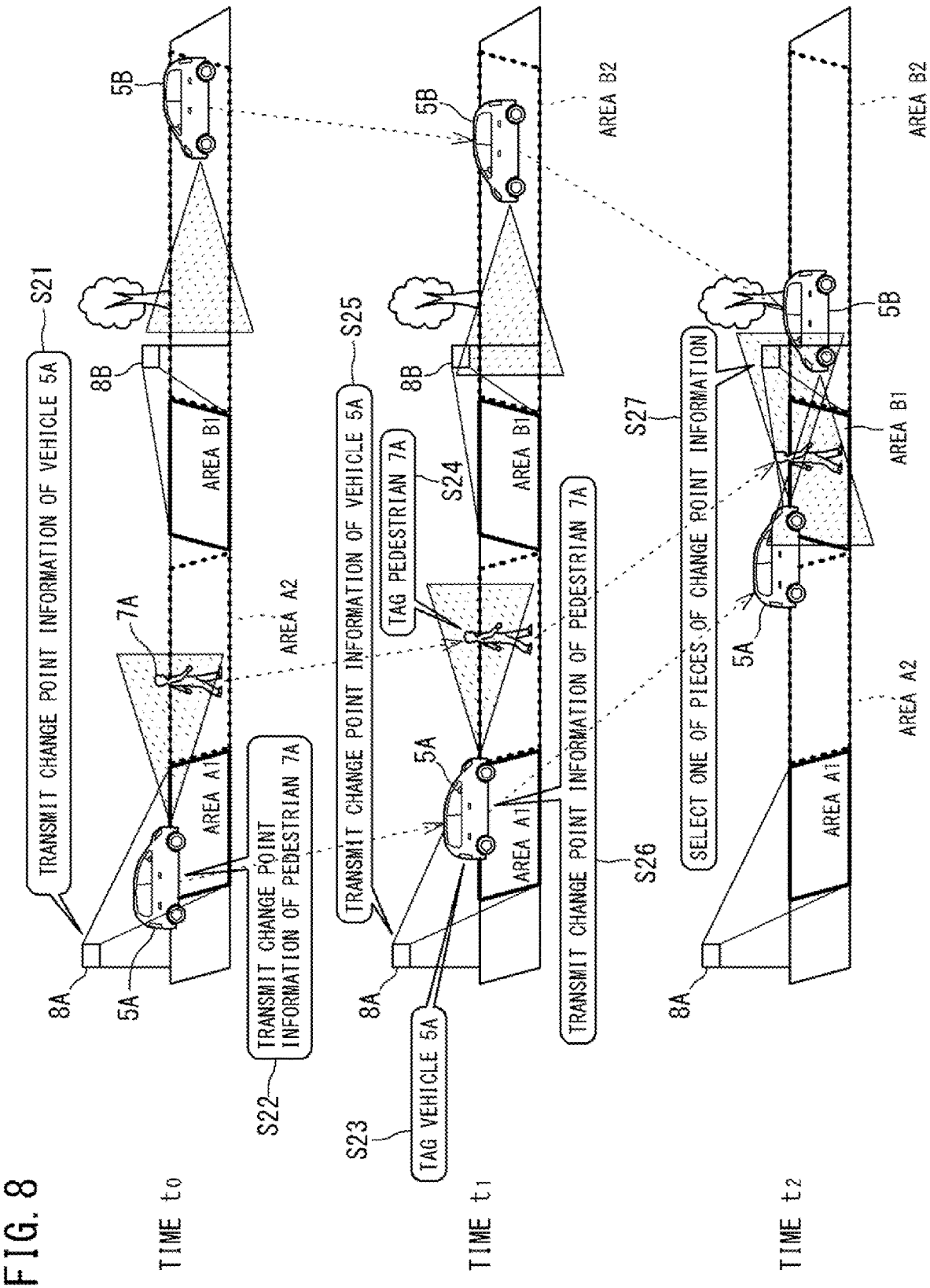
FIG. 8 is a diagram describing one example of a selection method in a case where conflicting change information has been received.

FIG. 8 is a diagram describing one example of a selection method in a case where the edge server 3 has received conflicting change point information.

In FIG. 8, the time advances in the order of t0→t1→t2. A vehicle 5A is traveling on the road in the right direction, a vehicle 5B is traveling on the road in the left direction, and a pedestrian 7A is walking on the road in the right direction.

An area A1 is a shooting area where a roadside sensor 8A can calculate the positional information of a recognized object at a high accuracy, and an area A2 is a shooting area where the roadside sensor 8A can calculate the positional information of a recognized object at a low accuracy.

An area B1 is a shooting area where a roadside sensor 8B can calculate the positional information of a recognized object at a high accuracy, and an area B2 is a shooting area where the roadside sensor 8B can calculate the positional information of a recognized object at a low accuracy.

Each triangular region having broken-line hatching is a shooting area of which images can be taken by the on-vehicle camera 59 of the vehicle 5A, 5B. It is assumed that time synchronization has been realized between the vehicles 5A, 5B, the roadside sensors 8A, 8B, and the edge server 3 with use of the GPS time or the like.

At the time t0, the vehicle 5A starts entering the area A1, and the pedestrian 7A is included in the shooting area of the vehicle 5A.

In this case, at the time t0, the roadside sensor 8A transmits, to the edge server 3, change point information for making notification of the initial detection (change point) of a recognized object (in actuality, the vehicle 5A) (step S21).

The above change point information includes image data of the recognized object, the object position, identification information for accuracy determination (measurement in the area A1, etc.), and the sensor ID of the roadside sensor 8A.

Similarly, at the time t0, the vehicle 5A transmits, to the edge server 3, change point information for making notification of the initial detection (change point) of a recognized object (in actuality, the pedestrian 7A) (step S22).

The above change point information includes image data of the recognized object, the object position, identification information for accuracy determination (measurement by a monocular camera, etc.), and the vehicle ID of the vehicle 5A.

The edge server 3 having received the change point information in steps S21 and S22 determines, on the basis of the image data, that the recognized objects are the vehicle 5A and the pedestrian 7A and tags each recognized object (steps S23, S24).

At the time t1, the vehicle 5A is still traveling in the area A1, and the pedestrian 7A is still included in the shooting area of the vehicle 5A.

In this case, at the time t1, the roadside sensor 8A transmits, to the edge server 3, change point information for making notification of movement (change point) of the recognized object (in actuality, the vehicle 5A) (step S25).

The above change point information includes image data of the recognized object, the object position, identification information for accuracy determination (measurement in the area A1, etc.), and the sensor ID of the roadside sensor 8A.

Similarly, at the time t1, the vehicle 5A transmits, to the edge server 3, change point information for making notification of movement (change point) of the recognized object (in actuality, the pedestrian 7A) (step S26).

The above change point information includes image data of the recognized object, the object position, identification information for accuracy determination (measurement by a monocular camera, etc.), and the vehicle ID of the vehicle 5A.

At the time t2, the vehicle 5A is about to enter the area B1, and the pedestrian 7A is walking in the area B1. The pedestrian 7A is included in the shooting area of both of the two vehicles 5A and 5B.

In this case, at the time t2, the roadside sensor 8B transmits, to the edge server 3, change point information for making notification of the initial detection (change point) of a recognized object (in actuality, the pedestrian 7A) (step S25).

The above change point information includes image data of the recognized object, the object position, identification information for accuracy determination (measurement in the area B1, etc.), and the sensor ID of the roadside sensor 8B.

At the time t2, the vehicle 5A transmits, to the edge server 3, change point information for making notification of movement (change point) of the recognized object (in actuality, the pedestrian 7A), and the vehicle 5B transmits, to the edge server 3, change point information for making notification of the initial detection (change point) of a recognized object (in actuality, the pedestrian 7A).

Therefore, at the time t2, with respect to the same pedestrian 7A, the pieces of change point information received from the roadside sensor 8B and the two vehicles 5A, 5B conflict with one another.

Thus, on the basis of the identification information for accuracy determination sent from each communication node, the edge server 3 selects one of the pieces of change point information (step S27), and updates the dynamic information by use of the selected change point information.

Specifically, on a condition that the object positions included in the change point information received from the roadside sensor 8B and the two vehicles 5A, 5B are within a predetermined distance (for example, 20 cm), the edge server 3 applies a predetermined selection criterion based on the identification information.

For example, in a case where a selection criterion which takes precedence a roadside sensor over a vehicle sensor is employed, the edge server 3 selects the change point information having the roadside sensor 8 as the transmission source, from among the three types of change point information at the time t2.

However, the selection criterion for the change point information using the identification information is not limited thereto, and the following selection criteria 1 and 2 are conceivable, for example.

1) Change point information that has a shorter distance from the sensor to the recognized object is preferentially selected over change point information that has a longer distance from the sensor to the recognized object.

2) Change point information that has an object position measured by a higher precision sensor (for example, a stereo camera) is preferentially selected over change point information that has an object position measured by a lower precision sensor (for example, a monocular camera).

Collision Avoidance Process by Vehicle

Figure 9:
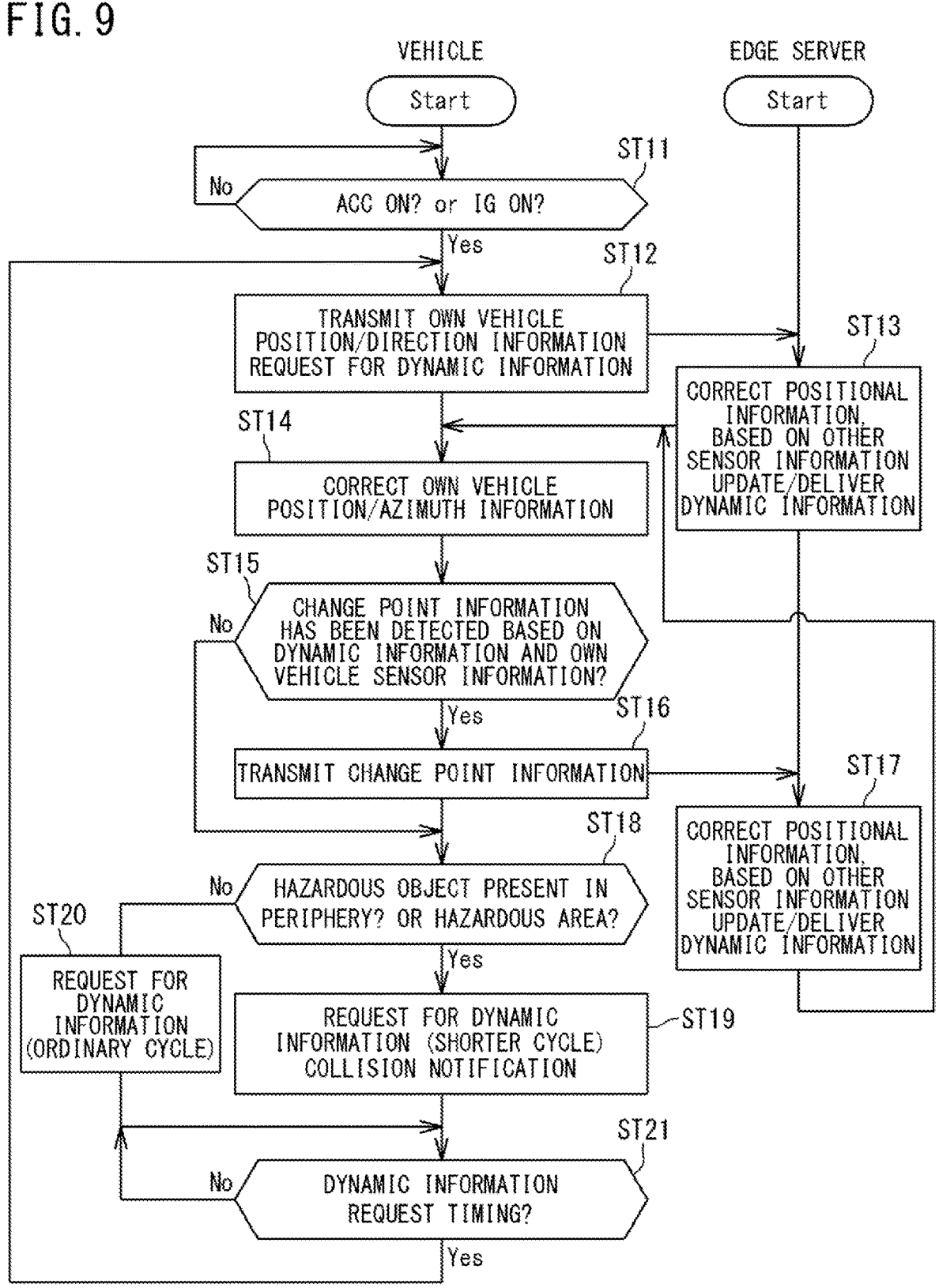
FIG. 9 is a flow chart showing one example of a collision avoidance process performed by a vehicle.

FIG. 9 is a flow chart showing one example of a collision avoidance process performed by a vehicle 5.

In the description below, the execution bodies are a vehicle 5 and an edge server 3, but the actual execution bodies are the control units 51 and 31 thereof.

As shown in FIG. 9, on a condition that an accessory power supply (ACC) or an ignition power supply (IG) is on (step ST11), the vehicle 5 transmits, to the edge server 3, the positional information and the azimuth information of the vehicle 5 and a request message for the dynamic information (step ST12).

Next, on the basis of other sensor information (change point information and the like acquired from a roadside sensor 8 and the like other than the vehicle 5 as the transmission source), the edge server 3 corrects the positional information received from the vehicle 5 to update the dynamic information, and delivers the updated dynamic information to the vehicle 5 (step ST13).

Next, by use of the received dynamic information, the vehicle 5 corrects the positional information and the azimuth information of the vehicle 5 (step ST14), and then, determines whether or not change point information has been detected, on the basis of a result of comparison between the received dynamic information and the sensor information of the vehicle 5 (step ST15).

When the determination result in step S15 is positive, the vehicle 5 transmits the calculated change point information to the edge server 3 (step ST16), and then, performs a determination process in step ST18.

The edge server 3 having received the change point information corrects, on the basis of other sensor information (change point information and the like acquired from a roadside sensor 8 and the like), the positional information received from the vehicle 5 to update the dynamic information, and delivers the updated dynamic information to the vehicle 5 (step ST17).

When the determination result in step S15 is negative, the vehicle 5 performs the determination process in step ST18, without performing the change point information transmitting process (step ST16).

The determination process in step ST18 is a process of determining whether or not there is a hazardous object around the vehicle 5, or whether or not the vehicle 5 is in a hazardous area.

The hazardous object means a pedestrian or the like that crosses a roadway that has no crosswalk. The hazardous area means an intersection or the like that has no traffic signal and into which another vehicle having a risk of collision is advancing.

When the determination result in step ST18 is positive, the vehicle 5 requests the edge server 3 for the dynamic information in a shorter cycle than usual, and notifies the occupant of the vehicle 5 that there is a possibility of collision with another vehicle 5 or a pedestrian 7 (step ST19).

When the determination result in step ST18 is negative, the vehicle 5 requests the edge server 3 for the dynamic information in an ordinary cycle, and does not make notification that there is a possibility of collision with another vehicle 5 or a pedestrian 7 (step ST20).

Next, on a condition that the request timing for the dynamic information in the next cycle has come (step ST21), the vehicle 5 returns the process before step ST12.

Collision Avoidance Process by Pedestrian Terminal

Figure 10:
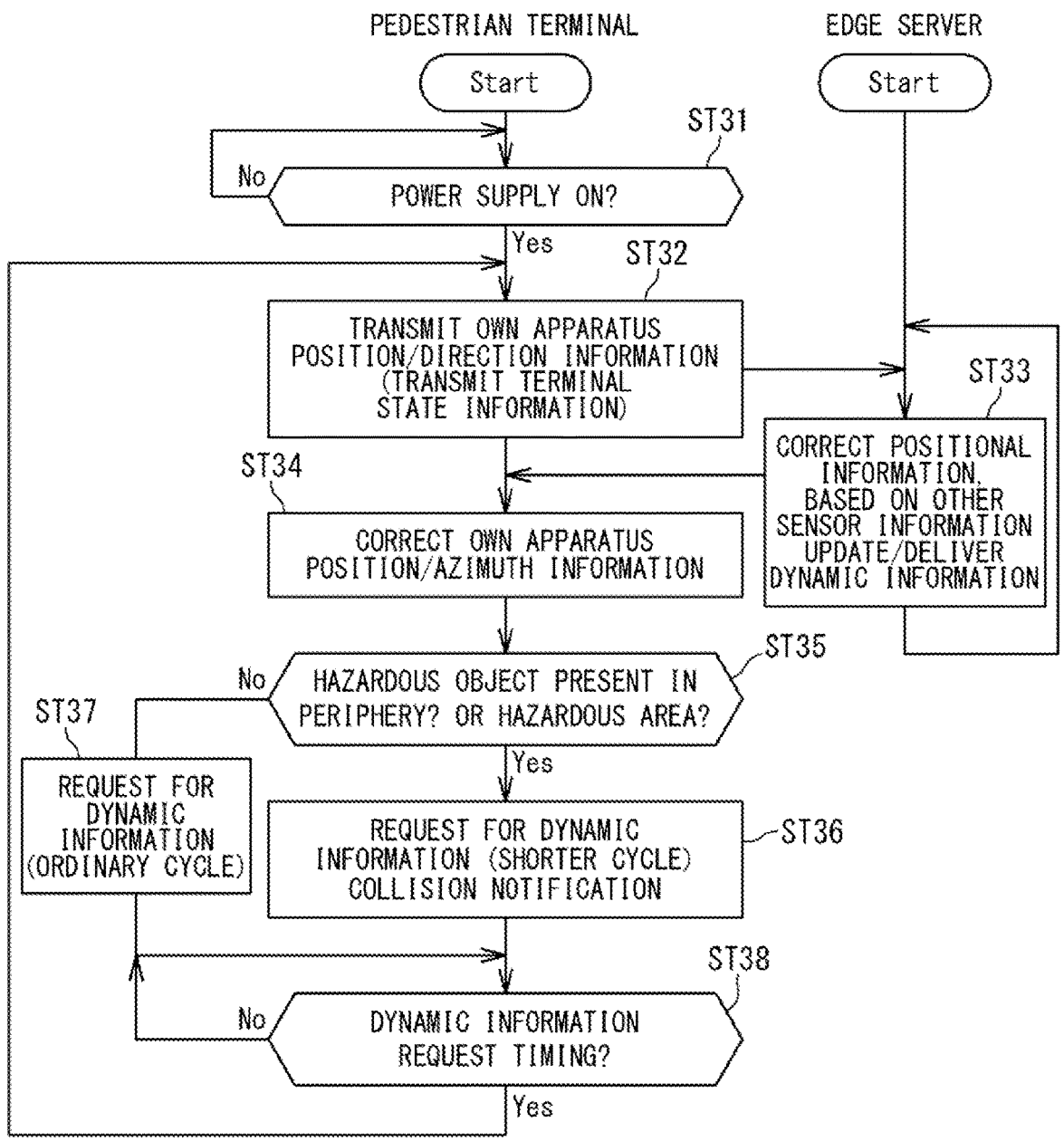
FIG. 10 is a flow chart showing one example of a collision avoidance process performed by a pedestrian terminal.

FIG. 10 is a flow chart showing one example of a collision avoidance process performed by a pedestrian terminal 70.

In the description below, the execution bodies are a pedestrian terminal 70 and an edge server 3, but the actual execution bodies are the control units 71, 31 thereof.

As shown in FIG. 10, on a condition that the power supply is on (step ST31), the pedestrian terminal 70 transmits, to the edge server 3, the positional information and the azimuth information of the pedestrian terminal 70 and a request message for the dynamic information (step ST32). In this case, the terminal state information described above may be transmitted.

Next, on the basis of other sensor information (change point information and the like acquired from a vehicle 5, a roadside sensor 8, and the like), the edge server 3 corrects the positional information received from the pedestrian terminal 70 to update the dynamic information, and delivers the updated dynamic information to the pedestrian terminal 70 (step ST33).

Next, by use of the received dynamic information, the pedestrian terminal 70 corrects the positional information and the azimuth information of the pedestrian terminal 70 (step ST34), and then performs a determination process in step ST35.

The determination process in step ST35 is a process of determining whether or not there is a hazardous object around the pedestrian terminal 70, or whether or not the pedestrian terminal 70 is in a hazardous area.

The hazardous object means a vehicle that is approaching the pedestrian terminal 70 at a high speed or a closest pedestrian or the like that is approaching the pedestrian terminal 70. The hazardous area means an intersection or the like where passing is not allowed because of a red signal or the like.

When the determination result in step ST35 is positive, the pedestrian terminal 70 requests the edge server 3 for the dynamic information in a shorter cycle than usual, and notifies the pedestrian 7 that there is a possibility of collision with a vehicle 5 or a pedestrian 7 (step ST36).

When the determination result in step ST35 is negative, the pedestrian terminal 70 requests the edge server 3 for the dynamic information in an ordinary cycle and does not make notification that there is a possibility of collision with a vehicle 5 or a pedestrian 7 (step ST37).

Next, on a condition that the request timing for the dynamic information in the next cycle has come (step ST38), the pedestrian terminal 70 returns the process before step ST32.

Service Case Example of Information Providing System

As described above, in the information providing system of the present embodiment, the edge server 3 (or the core server 4) can update the dynamic information of the dynamic information map M1 substantially at real time, on the basis of the sensor information (specifically, change point information) collected from the vehicle 5 and the roadside sensor 8.

Figure 11:
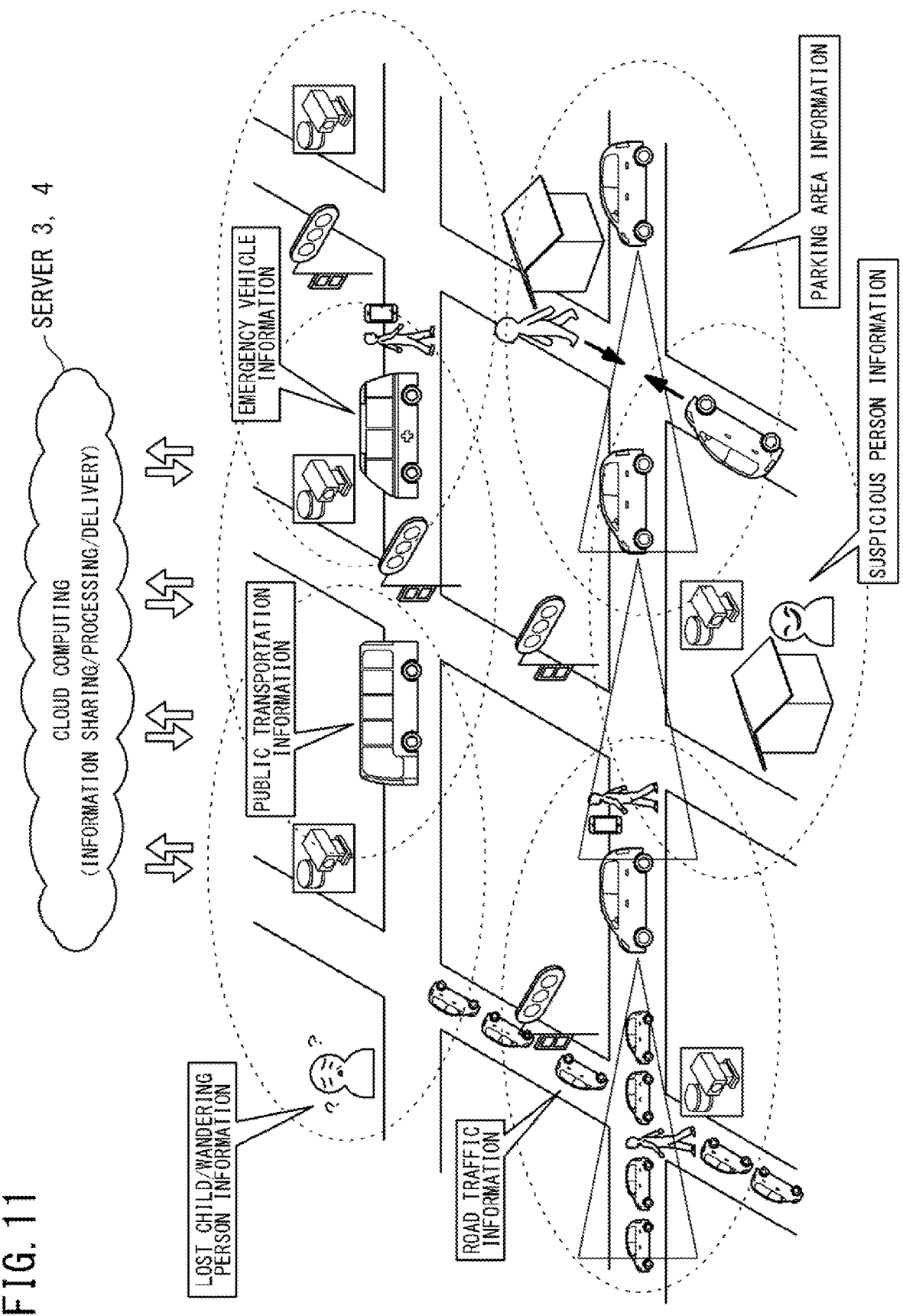
FIG. 11 is a diagram describing a service case example of the information providing system.

Therefore, depending on the type of the dynamic information included in the management target, various types of information can be provided to the user. FIG. 11 is a diagram describing a service case example of the information providing system.

As shown in FIG. 11, the server 3, 4 can provide "lost child/wanderer information" to the user.

For example, when the positional information of a pedestrian terminal 70 owned by an elderly pedestrian 7 specified from a portable-terminal ID circulates a residence area many times, the server 3, 4 determines that the pedestrian 7 is a lost child or is wandering, and transmits the determination result to a pedestrian terminal 70 owned by a family member.

The server 3, 4 can provide "public transportation information" to the user.

For example, when a pedestrian terminal 70 owned by the user is stopped at a bus stop, the server 3, 4 calculates, on the basis of the positional information of a fixed-route bus specified from a vehicle ID, an expected time at which the fixed-route bus will the arrive at the bus stop, and transmits the calculated expected time to the pedestrian terminal 70 of the user.

The server 3, 4 can provide "emergency vehicle information" to the user.

For example, when a vehicle 5 owned by the user is traveling on a road, the server 3, 4 calculates, on the basis of the positional information of an ambulance specified from a vehicle ID, an expected time at which the ambulance will catch up to the vehicle 5, and transmits the calculated expected time to the vehicle 5 of the user.

The server 3, 4 can provide "road traffic information" to the user.

For example, when the server 3, 4 has detected congestion caused by a large number of vehicles 5 being present in a predetermined road section, the server 3, 4 generates congestion information such as link data, congestion length, and the like of the congested road section, and transmits the generated congestion information to a vehicle 5 owned by the user.

The server 3, 4 can provide "suspicious person information" to the user.

For example, when the positional information of a pedestrian 7 acquired from a roadside sensor 8 implemented as a security camera circulates the same residence many times, the server 3, 4 determines that the pedestrian 7 is a suspicious person, and transmits the determination result to a pedestrian terminal 70 of the user who owns the residence.

The server 3, 4 can provide "parking area information" to the user.

For example, on the basis of image data acquired from a roadside sensor 8 installed in a parking area, the server 3, 4 calculates the number of vehicles and the number of vacant parking spaces present in the parking area, and transmits the calculated information to a vehicle 5 owned by the user.

Advantages of Information Providing System

Figure 12:
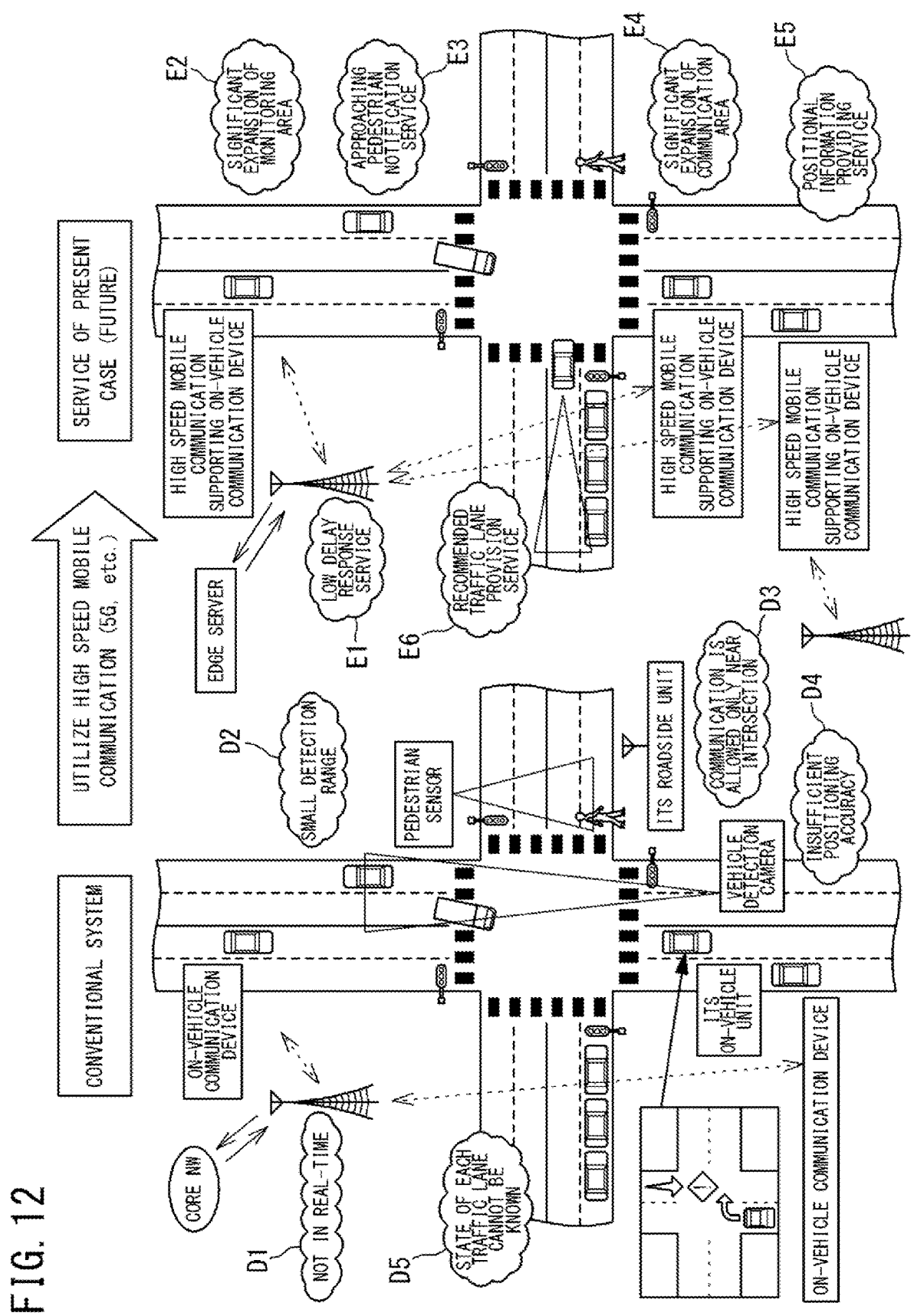
FIG. 12 is a diagram describing advantages of the information providing system of the present embodiment when compared with a conventional system.

FIG. 12 is a diagram describing advantages of the information providing system of the present embodiment (hereinafter, referred to as "the present system") compared with a conventional system.

Hereinafter, with reference to FIG. 12, defects D1 to D5 of the conventional system and advantages E1 to E6 of the present system will be described.

In the conventional system, probe information or the like is shared through mobile body communication performed by on-vehicle communication devices such as on-vehicle TCU (Telematics Communication unit). However, mobile body communication up to 4G is performed via a core network, and thus, there is a defect that the communication is provided not in real-time (see D1).

In contrast, in the present system, the vehicle 5 has the communication terminal 1A that supports high speed mobile communication such as 5G and thus, there is an advantage that low delay response service (see E1) via the edge server 3, for example, can be provided to the occupant of the vehicle 5.

In the conventional system, the presence/absence or the like of a pedestrian is detected by a pedestrian sensor, but there is a defect that the pedestrian sensor is installed only locally to a place such as a crosswalk where a large number of pedestrians pass, and the range of detecting the pedestrians 7 is small (see D2).

In contrast, in the present system, the dynamic information including the positional information of pedestrians 7 is updated on the basis of sensor information measured by vehicles 5 and roadside sensors 8 included in the service area of the edge server 3. Therefore, there is an advantage that: the monitoring area is significantly expanded (see E2); and approaching pedestrian notification service (see E3) can be provided to the user.

In the conventional system, in a case of a vehicle 5 that supports ITS, the vehicle 5 can perform wireless communication with an ITS roadside unit operated by a road administrator. However, there is a defect that: the communication range of the ITS roadside unit is about 200 m from an intersection; and communication is allowed only in the vicinity of the intersection (see D3).

In contrast, in the present system, the edge server 3 performs, through wireless communication, collection of information and delivery of the dynamic information within the service area thereof. Therefore, there is an advantage that the communication area is significantly expanded (see E4).

In the conventional system, the number of vehicles near an intersection and the vehicle positions can be detected by a vehicle detection camera or the like installed on a road. However, there is a defect that a sufficient positioning accuracy for the positional information of the vehicle or the like cannot be realized by a single vehicle detection camera (see D4).

In contrast, in the present system, the positional information of the same object can be corrected on the basis of sensor information collected from a plurality of vehicles and roadside sensors. Therefore, there is an advantage that an accurate positional information providing service (see E5) can be realized.

In the conventional system, an approximate number of vehicles that are stopped on a road can be calculated on the basis of probe information or the like transmitted by vehicles 5 that support ITS. However, the installation percentage of on-vehicle ITS units is not high yet, and thus, there is a defect that the state of each traffic lane cannot be known (see D5).

In contrast, in the present system, the dynamic information managed by the edge server 3 includes sensor information obtained by the on-vehicle cameras 59. Therefore, there is an advantage that the traffic on each traffic lane can be grasped, and a recommended traffic lane provision service (see E6) can be realized.

First Modification

In the embodiment described above, the vehicle 5 and the roadside sensor 8 generate change point information from sensor information, and transmit the generated change point information to the edge server 3 (steps S3, S4, S8, and S9 in FIG. 7). However, the sensor information may be directly transmitted to the edge server 3.

In this case, the process of generating change point information from each piece of sensor information may be performed by the edge server 3.

However, the sensor information of the vehicle 5 and the roadside sensor 8 includes picture data and the like, and thus, in order to reduce the communication load with the edge server 3, it is preferable that the vehicle 5 and the roadside sensor 8 generate change point information which has a smaller data amount.

Second Modification

In the embodiment described above, depending on the density state of vehicles 5 or pedestrians 7, the edge server 3 preferably generates dynamic information on the basis of sensor information from a different angle. Thus, the classification ability of objects included in sensor information can be improved.

When picture data of a vehicle 5 or a pedestrian 7 is included in the sensor information received from a vehicle 5 or a roadside sensor 8, the edge server 3 may calculate the direction of travel of the object on the basis of the picture data and reflect the calculation result on the dynamic information.

In the embodiment described above, the edge server 3 may determine the priority of change point information or sensor information collected from the vehicle 5 or the roadside sensor 8, and may determine whether the edge server 3 generates dynamic information or the core server 4 is caused to generate dynamic information, in accordance with the determined priority.

For example, the priority of change point information may be increased in a case where the object position is near an intersection, and the priority may be decreased in a case where the object position is in an area that has little traffic.

Accordingly, the edge server 3 generates dynamic information on the basis of change point information or sensor information having a higher priority, and the core server 4 generates dynamic information on the basis of change point information or sensor information having a lower priority. Therefore, the dynamic information of an area having a higher priority can be provided earlier.

The priority in a predetermined area may be dynamically changed in accordance with the density degree of vehicles 5, pedestrians 7, or the like.

For example, it is preferable to increase the priority of change point information or sensor information regarding an area where the density degree has increased, and notify the information transmission source of the area, of an instruction to shorten the transmission cycle. Conversely, it is preferable to increase the priority of change point information or sensor information regarding an area where the density degree has decreased, and notify the information transmission source of the area, of an instruction to extend the transmission cycle.

Accordingly, the update cycle of the dynamic information based on change point information or sensor information regarding an area having a higher priority can be shortened, and the dynamic information regarding the area having a higher priority can be provided earlier.

Third Modification

In the embodiment described above, the edge server 3 or the core server 4 preferably accumulates, for each recognized object, change point information or sensor information including image data of the recognized object.

Accordingly, by searching for change point information or sensor information for each vehicle 5 or each pedestrian 7 that is a recognized object, it becomes possible to track a specific vehicle 5 or pedestrian 7 in a time-series manner.

Modification of Information Providing System

Figure 13:
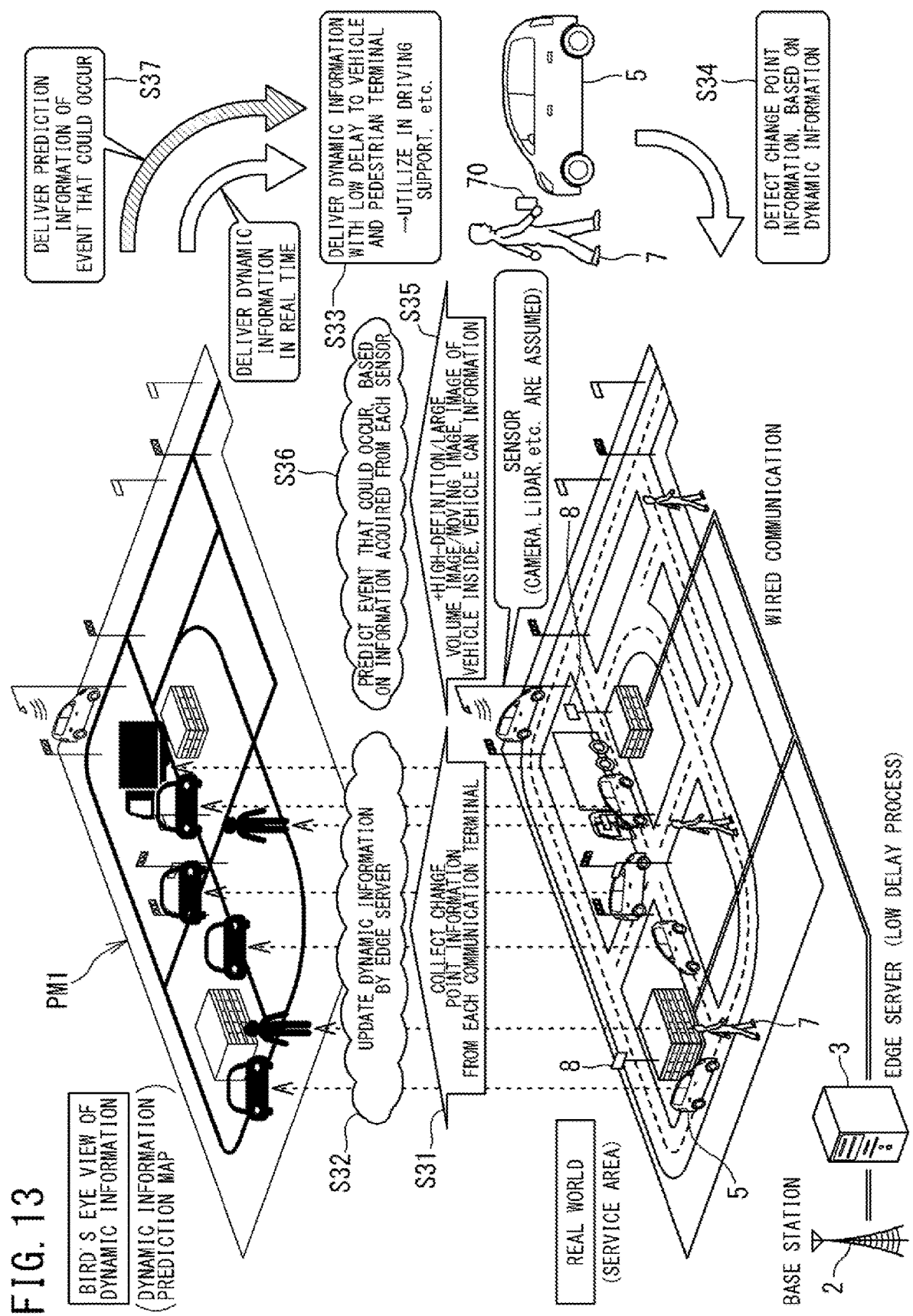
FIG. 13 is a diagram showing an overall configuration of an information providing system according to a modification of the present invention.

FIG. 13 is a diagram showing an overall configuration of an information providing system according to a modification of the present disclosure.

The information providing system shown in FIG. 13 is different from the information providing system shown in FIG. 6 in that: in addition to the dynamic information update process and the dynamic information delivery process (steps S31 to S34), the edge server 3 can deliver, to the vehicle 5, the pedestrian terminal 70, and the like, future dynamic information generated through an action prediction process regarding an object (hereinafter, referred to as "prediction information").

In the information providing system of this modification, the storage unit 34 of the edge server 3 has a dynamic information prediction map PM1 stored therein. The control unit 31 of the edge server 3 updates, for each predetermined update cycle, the prediction information of the map PM1 stored in the storage unit 34 (prediction information update process).

Specifically, the control unit 31 collects, for each predetermined update cycle, various types of sensor information measured by vehicles 5, roadside sensors 8, and the like in the service area of the edge server 3, from the 5G-supporting communication terminals 1A, 1C, and updates the prediction information of the map PM1 on the basis of the collected sensor information.

When the control unit 31 has received a request message for prediction information from the communication terminal 1A, 1B, of a certain user, the control unit 31 delivers, for each predetermined delivery cycle, the latest prediction information to the communication terminal 1A, 1B, which is the transmission source of the request message (prediction information delivery process).

The dynamic information prediction map PM1 may be a map obtained by superposing prediction information on a digital map forming the dynamic information map M1 (FIG. 2), or may be a map obtained by superposing prediction information on a digital map that is different from the dynamic information map M1.

In addition to the collection of change point information performed for each predetermined cycle (step S31), the edge server 3 can collect, for each predetermined cycle, sensor information measured by the vehicles 5 and the roadside sensors 8 (step S35).

The sensor information of the vehicle 5 includes high-definition image data (or moving images), vehicle CAN (Controller Area Network) information, and the like. The image data of the vehicle 5 is data of images of the surroundings of the vehicle 5 captured by the on-vehicle camera 59. In a case of a vehicle 5 having an in-vehicle camera, image data of the driver may be included.

The sensor information of the roadside sensor 8 includes high-definition image data (or moving images). The image data is data of image of a predetermined shooting area captured by the roadside camera 83.

The edge server 3 predicts, for each predetermined update cycle, an event that could occur at a certain spot in the service area after the present time point, on the basis of the information acquired from the sensors in the vehicles 5, the roadside sensors 8, and the like (action prediction process: step S36), and superposes the predicted prediction information at the certain spot on the dynamic information prediction map PM1.

When the edge server 3 has received a request from a vehicle 5 or a pedestrian terminal 70, the edge server 3 delivers the latest prediction information to the request-source communication node (step S37).

Accordingly, for example, the vehicle 5 that has received the prediction information can utilize the prediction information in the driving support for the occupant, or the like. In addition, if the pedestrian terminal 70 displays on the screen or outputs by sound the prediction information received from the edge server 3, the pedestrian 7 can take an action for avoiding collision with a vehicle 5, another pedestrian 7, or the like.

In FIG. 13, the input information in the action prediction process (step S36) is composed of the sensor information itself measured by the vehicles 5 and the roadside sensors 8. However, change point information collected from each communication terminal (step S21) may be used as the input information in the action prediction process.

FIG. 13 shows an example of an information providing system that includes a single edge server 3, but a plurality of edge servers 3 may be included. Alternatively, instead of the edge server 3 or in addition to the edge server 3, one or a plurality of core servers 4 may be included.

In the following, "PM1" will be used as the drawing reference sign of the dynamic information prediction map managed by the edge server 3, and "PM2" will be used as the drawing reference sign of the dynamic information prediction map managed by the core server 4.

Specific Example of Action Prediction Process

Figure 14:
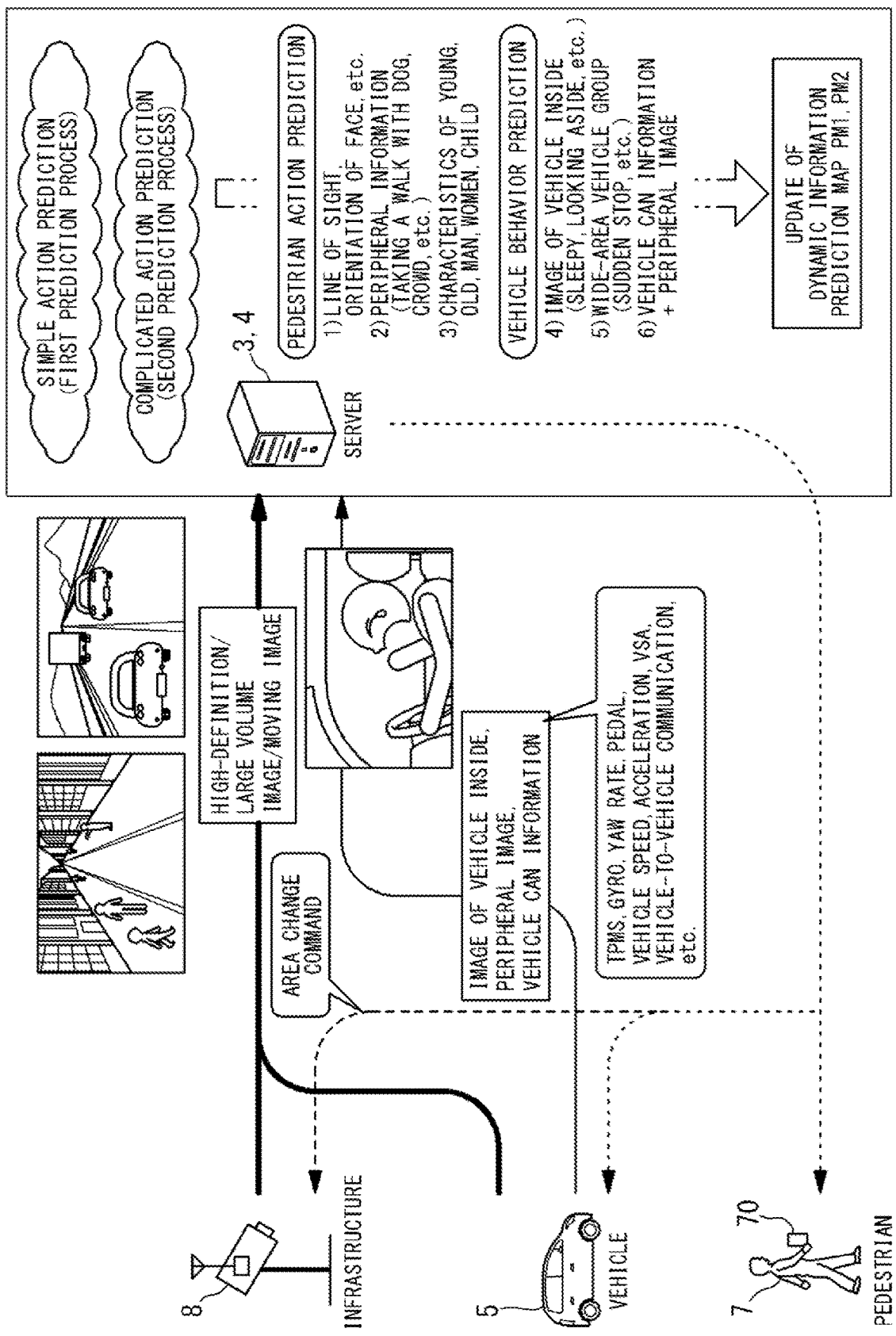
FIG. 14 is a diagram describing a specific example of an action prediction process performed by the server.

FIG. 14 is a diagram describing a specific example of the action prediction process performed by the server 3, 4.

As shown in FIG. 14, the action prediction process performed by the control unit 31, 41 of the server 3, 4 includes at least one of a "first prediction process" and a "second prediction process".

The "first prediction process" is a process of predicting future dynamic information regarding an object (for example, future positional information of the object, etc.) by a relatively simple algorithm, without consideration of factors such as the characteristics of the object and the surrounding state.

For example, a process that corresponds to the first prediction process is a process in which: coordinates (Xc, Yc) at the present time point, a speed Vc, and an azimuth angle θc (the angle in the clockwise direction from the north) of an object that is passing along a road are used as input information; and the vehicle position (Xt,Yt) after T seconds is calculated by the formula below.

$$(Xt,Yt)=(Xc+Vc\times T\times\sin\theta c, Yc+Vc\times T\times\cos\theta c)$$

The "second prediction process" is a process of predicting dynamic information of an object that could occur in the future, by a relatively complicated algorithm (for example, image analysis, pedestrian action estimation model, deep learning, etc.), in consideration of at least one of factors such as the characteristics of the object and the surrounding state.

The second prediction process is roughly divided into "pedestrian action prediction" of which the prediction target is the pedestrian 7, and "vehicle behavior prediction" of which the prediction target is the vehicle 5.

Pedestrian Action Prediction

As the pedestrian action prediction, the following processes 1 to 3 can be employed, for example.

Process 1) The moving direction of the pedestrian 7 is estimated on the basis of the line of sight, the orientation of the face, the orientation of the body, and the like of the pedestrian 7 included in image data, and the estimated moving direction is multiplied by a predetermined walking speed (set value), whereby the position of a pedestrian 7 after several seconds is predicted.

Process 2) A future action of a pedestrian 7 is estimated on the basis of the peripheral information (taking a walk with a dog, being present in a crowd, etc) of the pedestrian 7 included in image data, and a prediction position with a likelihood according to the estimated action is generated.

For example, with respect to a pedestrian 7 who is present in a crowd, a position to which the pedestrian 7 will move after several seconds and the likelihood thereof are calculated by use of an action estimation model in which the avoidance action between pedestrians 7 is analogized to the repulsive force acting between the same poles of magnets.

Process 3) An action of a pedestrian 7 is estimated on the basis of the attributes (young, old, man, women, child, or the like) of the pedestrian 7 included in image data, and a prediction position with a likelihood according to the estimated action is generated.

For example, in a case where the pedestrian 7 is an infant, the assumed range of movement from the present position is set to be wider than usual, and then, the position to which the pedestrian 7 will move after several seconds and the likelihood thereof are calculated. In a case where the pedestrian 7 is an elderly person, the position to which the pedestrian 7 will move after several seconds and the likelihood thereof are calculated by use of a speed value that is lower than usual.

Vehicle Behavior Prediction

As the vehicle behavior prediction, the following processes 4 to 6 can be employed, for example.

Process 4) A behavior of a vehicle 5 that could occur after the present time point is predicted on the basis of image data of the inside of the vehicle, and an event that could be caused by the predicted behavior is outputted together with the occurrence likelihood thereof.

For example, the facial expression of an occupant extracted from image data in the vehicle is determined by a facial expression recognition technique based on deep learning, and when the determined facial expression is "sleepy", it is predicted that the vehicle 5 driven by the occupant is a hazardous vehicle having a high possibility of veering off the traffic lane.

Process 5) An expansion speed of a wide-area vehicle group (congestion section) is calculated on the basis of peripheral images of vehicles 5, image data from roadside sensors 8, and the like, and the congestion end position after several seconds is predicted from the calculated expansion speed.

Process 6) A behavior that could occur after the present time point is predicted on the basis of vehicle CAN information and peripheral images of a vehicle 5, and an event that could be caused by the predicted behavior is outputted together with the occurrence likelihood thereof.

The vehicle CAN information includes information regarding TPMS (Tire Pressure Monitoring System), gyro, yaw rate, pedal, vehicle speed, acceleration, VSA (Vehicle Stability Assist), vehicle-to-vehicle communication, and the like.

Thus, for example, when the yaw rate value of a vehicle 5 is cyclically varying and the peripheral image is varying as a whole in the same cycle, it is predicted that the vehicle 5 driven by the occupant is a hazardous vehicle having a high possibility of veering off the traffic lane.

Other than the above, the server 3, 4 may make a prediction such that a facility, such as a school or a kindergarten facing a road, is a spot where dashing of a child frequently occurs or a spot where a traffic accident frequently occurs, or may make a prediction such that a congested road is a path where traffic lane changing frequently occurs.

In a case where the roadside sensor 8 is of a model capable of changing the shooting area, the server 3, 4 may transmit a shooting area changing command to the roadside sensor 8. In this case, the range of collection of image data to be used in the action prediction process can be changed.

Variation of Information Providing System

FIG. 15 to FIG. 18 are each a diagram describing a variation of the information providing system that is different depending on the execution body of the action prediction process.

A Case Without a Communication Terminal Having an Action Prediction Function

Figure 15:
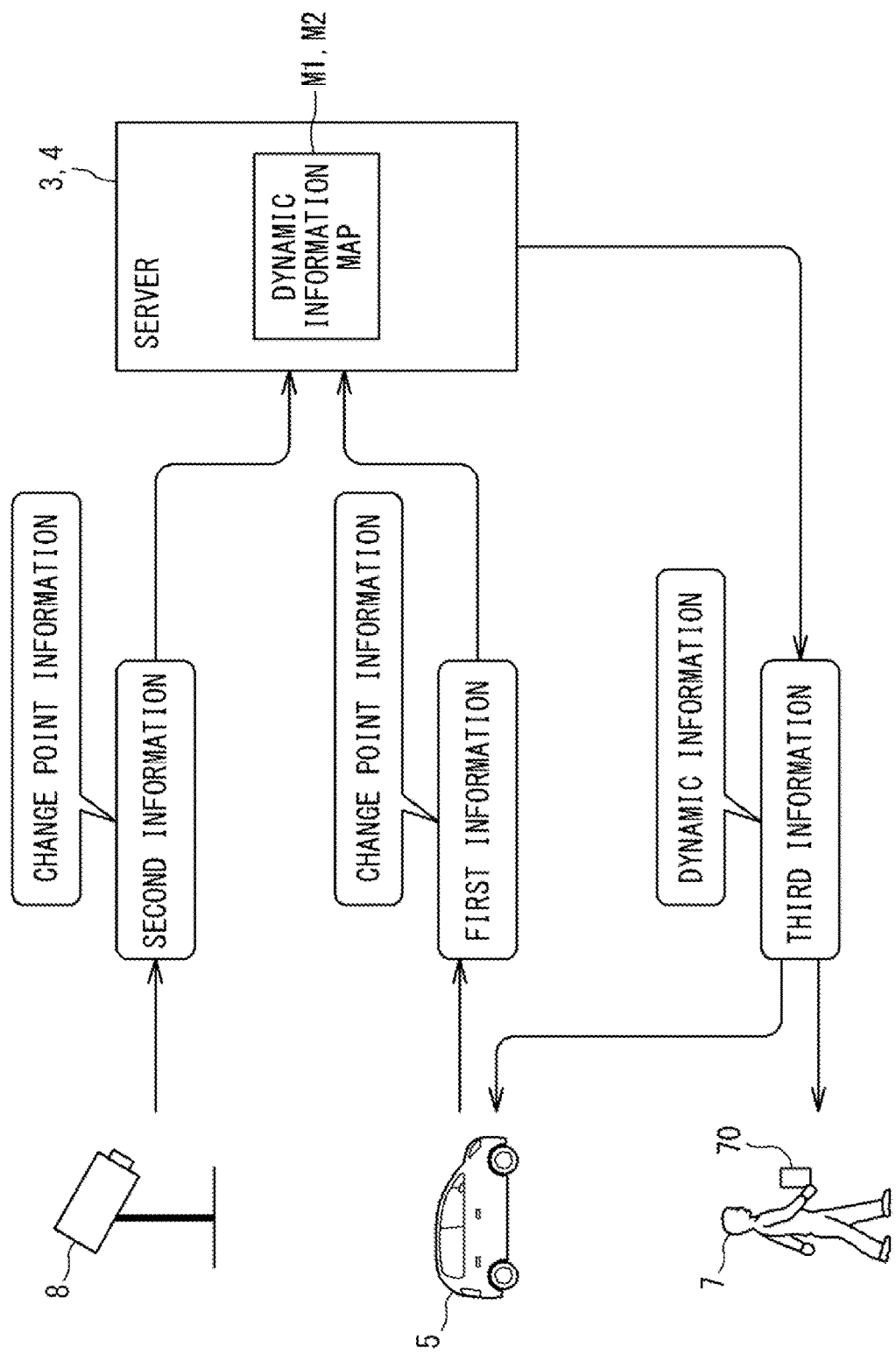
FIG. 15 is a diagram describing the flow of information transmitted/received in an information providing system that does not include a communication terminal having an action prediction function.

FIG. 15 is a diagram describing the flow of information transmitted/received in an information providing system that does not include a communication terminal having an action prediction function. That is, the illustration in FIG. 15 describes the flow of information in the information providing system shown in FIG. 6.

First information transmitted to the server 3, 4 by the vehicle 5 as a mobile terminal includes change point information calculated by the vehicle 5. Second information transmitted to the server 3, 4 by the roadside sensor 8 as a fixed terminal includes change point information calculated by the roadside sensor 8.

However, the first information may include sensor information of the vehicle 5, and the second information may include sensor information of the roadside sensor 8. In this case, the server 3, 4 can generate dynamic information in the server 3, 4 from the respective pieces of sensor information.

The server 3, 4 holds the dynamic information map M1, M2. The server 3, 4 integrates, for each predetermined update cycle, the received first and second information (change point information) to update the dynamic information of the dynamic information map M1, M2.

Third information delivered by the server 3, 4 includes the dynamic information. The server 3, 4 transmits, in a predetermined delivery cycle, the updated dynamic information to the vehicle 5 or the pedestrian terminal 70, which is the transmission source of the request message.

A Case Where the Server has an Action Prediction Function

Figure 16:
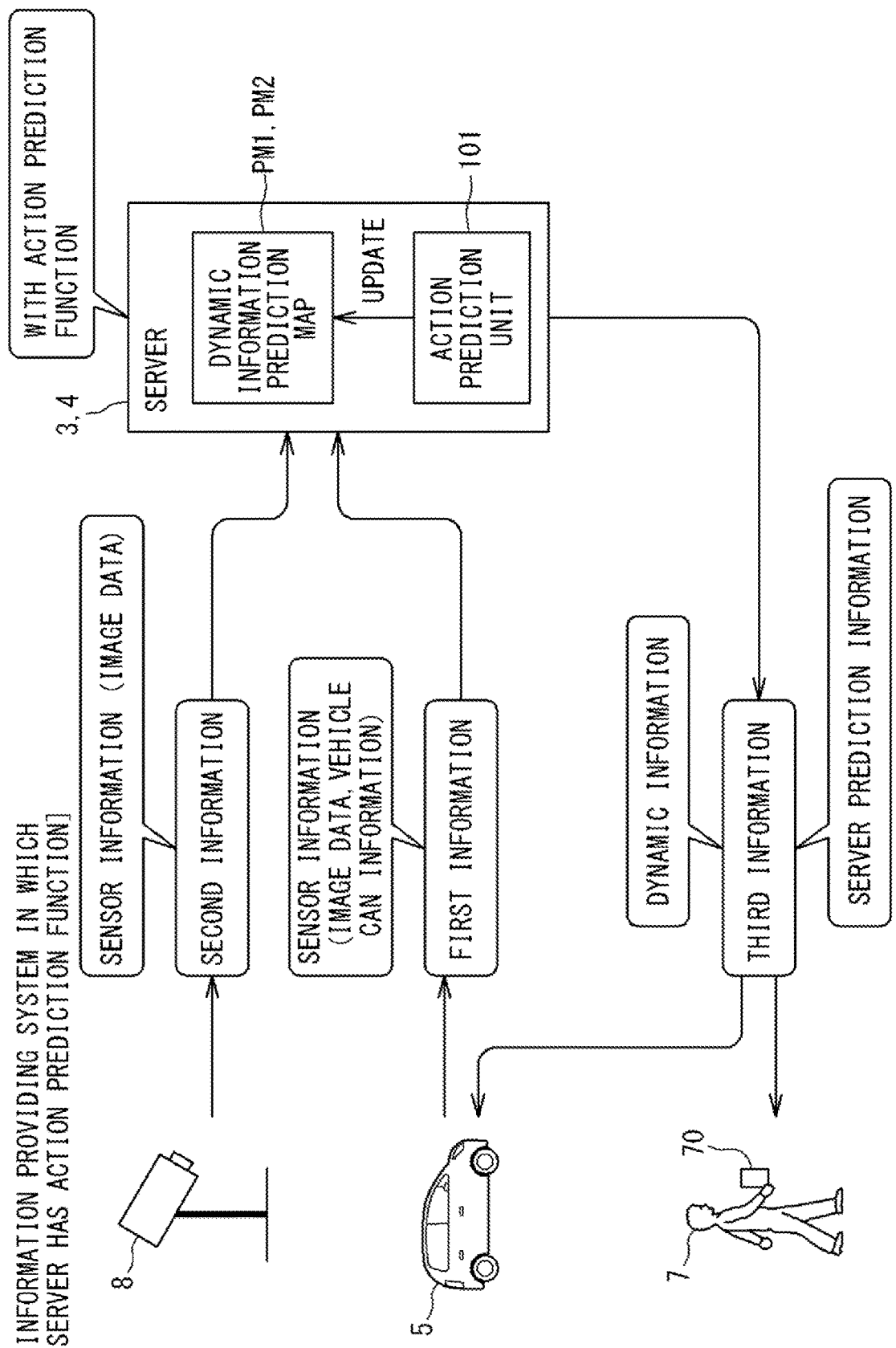
FIG. 16 is a diagram describing the flow of information transmitted/received in an information providing system in which the server has an action prediction function.

FIG. 16 is a diagram describing the flow of information transmitted/received in an information providing system in which the server 3, 4 has an action prediction function. That is, the illustration in FIG. 16 describes the flow of information in the information providing system shown in FIG. 13.

First information transmitted to the server 3, 4 by the vehicle 5 as a mobile terminal includes sensor information of the vehicle 5 (for example, image data and vehicle CAN information). Second information transmitted to the server 3, 4 by the roadside sensor 8 as a fixed terminal includes sensor information of the roadside sensor 8 (for example, image data).

However, the first information may include change point information calculated by the vehicle 5, and the second information may include change point information calculated by the roadside sensor 8. In this case, the server 3, 4 may perform the action prediction process on the basis of the change point information.

The server 3, 4 holds the dynamic information prediction map PM1, PM2, and includes an action prediction unit 101 which performs the above-described action prediction process.

The action prediction unit 101 generates, for each predetermined update cycle, prediction information on the basis of the received first and second information (sensor information), and superposes the generated prediction information on the dynamic information prediction map PM1, PM2 to update the map PM1, PM2.

Third information delivered by the server 3, 4 includes the prediction information generated by the action prediction unit 101 (hereinafter, referred to as "server prediction information"). The server 3, 4 transmits, in a predetermined delivery cycle, the generated server prediction information to the vehicle 5 or the pedestrian terminal 70, which is the transmission source of the request message.

The third information delivered by the server 3, 4 may include the dynamic information. In this case, the server 3, 4 transmits, in a predetermined delivery cycle, the updated dynamic information to the vehicle 5 or the pedestrian terminal 70, which is the transmission source of the request message.

A Case Where the Vehicle Has an Action Prediction Function

Figure 17:
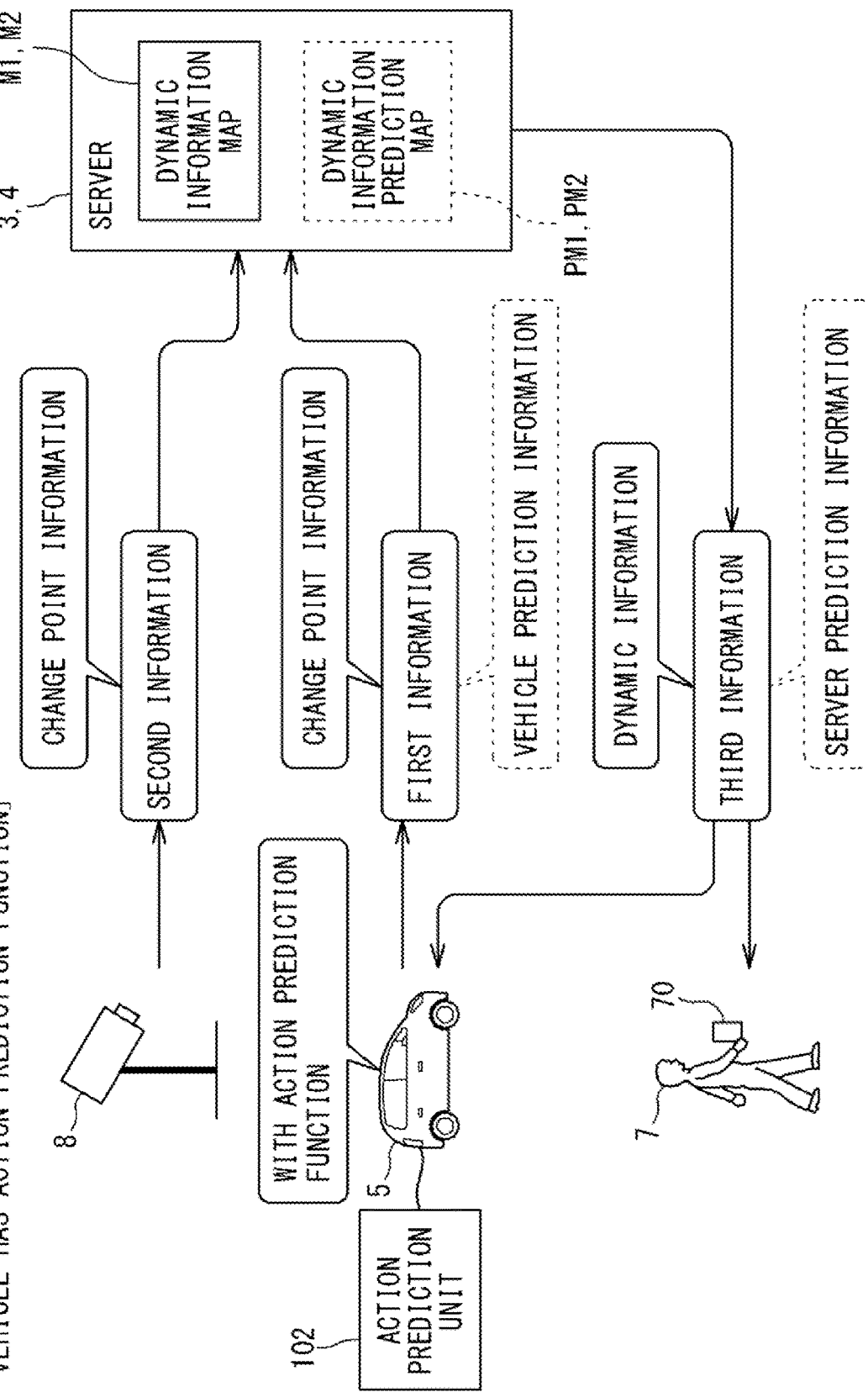
FIG. 17 is a diagram describing the flow of information transmitted/received in an information providing system in which the vehicle has an action prediction function.

FIG. 17 is a diagram describing the flow of information transmitted/received in an information providing system in which the vehicle 5 has an action prediction function. That is, as shown in FIG. 17, the vehicle 5 has an action prediction unit 102 which performs the above-described action prediction process, and the server 3, 4 does not have the action prediction unit 101. Not all vehicles 5 may have the action prediction unit 102.

First information transmitted to the server 3, 4 by the vehicle 5 as a mobile terminal includes change point information calculated by the vehicle 5. Second information transmitted to the server 3, 4 by the roadside sensor 8 as a fixed terminal includes change point information calculated by the roadside sensor 8.

However, the first information may include sensor information of the vehicle 5, and the second information may include sensor information of the roadside sensor 8. In this case, the server 3, 4 can generate dynamic information in the server 3, 4 on the basis of the respective pieces of sensor information.

The server 3, 4 holds the dynamic information map M1, M2. The server 3, 4 integrates, for each predetermined update cycle, the received first and second information (change point information) to update the dynamic information of the dynamic information map M1, M2.

Third information delivered by the server 3, 4 includes the dynamic information. The server 3, 4 transmits, in a predetermined delivery cycle, the updated dynamic information to the vehicle 5 or the pedestrian terminal 70, which is the transmission source of the request message.

The dynamic information (third information) received by the vehicle 5 is information obtained by the server 3, 4 collecting change point information for each predetermined update cycle from a large number of vehicles 5 and roadside sensors 8 in the service area and integrating the collected change point information.

Therefore, the vehicle 5 at the dynamic information reception side can acquire dynamic information of not only an object within the sensing range of the on-vehicle camera 59 and the radar sensor 60 of the vehicle 5 (hereinafter, referred to as "inside object"), but also an object that is present outside the sensing range (hereinafter, referred to as "outside object").

Therefore, the action prediction unit 102 of the vehicle 5 may perform not only an action prediction process regarding the inside object based on the sensor information of the apparatus but also an action prediction process regarding the outside object.

Accordingly, also with respect to the outside object outside the sensing range of the vehicle 5, future dynamic information of the object can be predicted.

As indicated by a broken line frame in FIG. 17, the vehicle 5 may cause the first information to include prediction information outputted by the action prediction unit 102 (hereinafter, referred to as "vehicle prediction information").

In this case, the server 3, 4 can collect the vehicle prediction information from a plurality of vehicles 5 included in the service area.

Therefore, if the server 3, 4 superposes the vehicle prediction information collected from the vehicles 5 in the service area, on the dynamic information map M1, M2, the server 3, 4 can create the dynamic information prediction map PM1, PM2.

In addition, if the prediction information included in the created dynamic information prediction map PM1, PM2 is caused to be included as the server prediction information into the third information, the server 3, 4 can deliver prediction information, which is generated by vehicles 5 in an autonomous and distributed manner, to vehicles 5 and pedestrian terminals 70 in the service area.

A Case Where the Server and the Vehicle Each Have an Action Prediction Function

Figure 18:
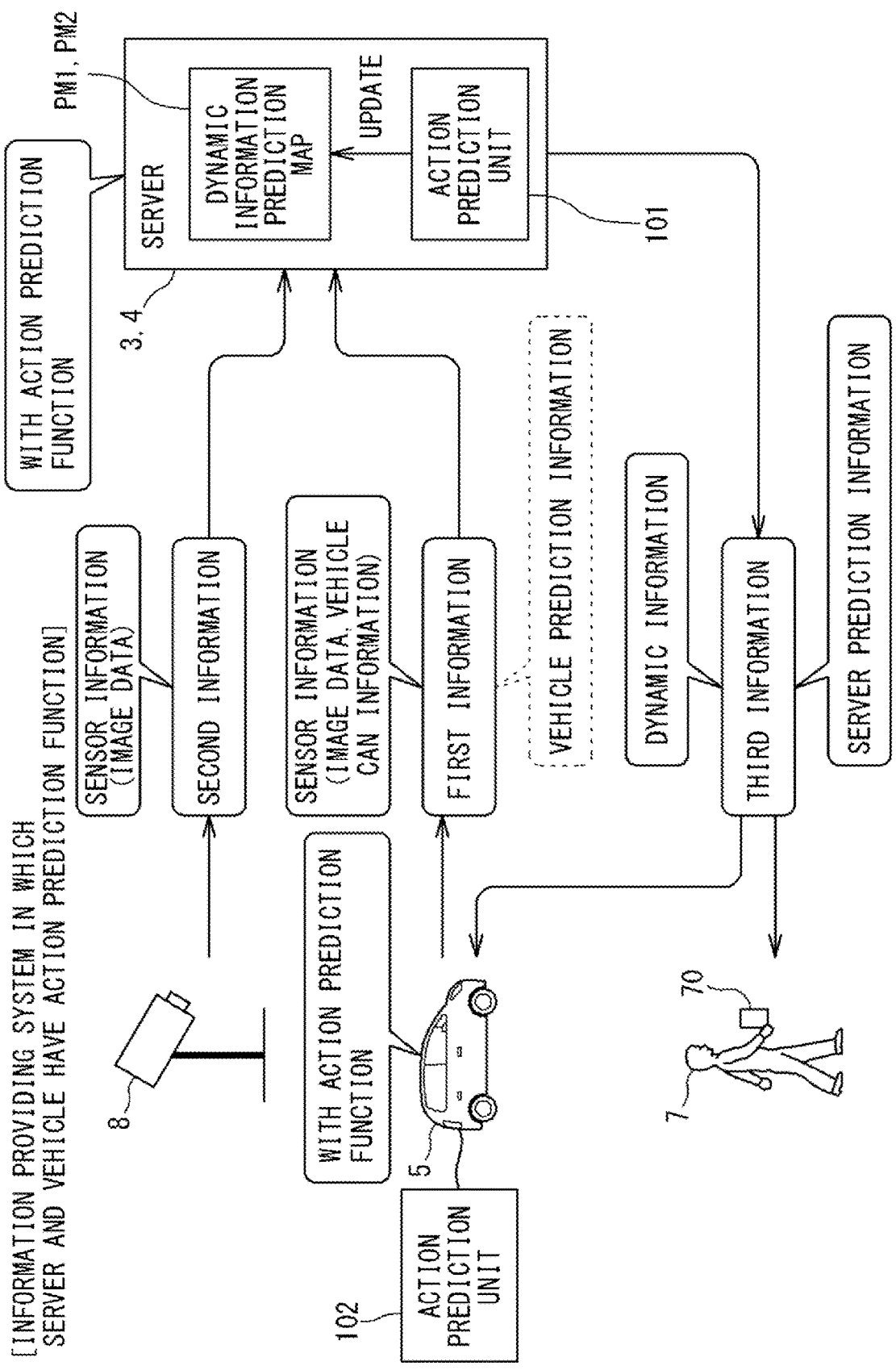
FIG. 18 is a diagram describing the flow of information transmitted/received in an information providing system in which the server and the vehicle each have an action prediction function.

FIG. 18 is a diagram describing the flow of information transmitted/received in an information providing system in which the server 3, 4 and the vehicle 5 each have an action prediction function. That is, as shown in FIG. 18, the server 3, 4 has the action prediction unit 101 which performs the above-described action prediction process, and the vehicle 5 also has the action prediction unit 102 which performs the above-described action prediction process. Not all the vehicles 5 may have the action prediction unit 102.

First information transmitted to the server 3, 4 by the vehicle 5 as a mobile terminal includes sensor information of the vehicle 5 (for example, image data and vehicle CAN information). Second information transmitted to the server 3, 4 by the roadside sensor 8 as a fixed terminal includes sensor information of the roadside sensor 8 (for example, image data).

However, the first information may include change point information calculated by the vehicle 5, and the second information may include change point information calculated by the roadside sensor 8. In this case, the server 3, 4 may perform the action prediction process on the basis of the change point information.

The server 3, 4 holds the dynamic information prediction map PM1, PM2, and has the action prediction unit 101 which performs the above-described action prediction process.

The action prediction unit 101 generates, for each predetermined update cycle, prediction information on the basis of the received first and second information (sensor information), and superposes the generated prediction information on the dynamic information prediction map PM1, PM2 to update the map PM1, PM2.

Third information delivered by the server 3, 4 includes the server prediction information generated by the action prediction unit 101. The server 3, 4 transmits, in a predetermined delivery cycle, the generated server prediction information to the vehicle 5 or the pedestrian terminal 70, which is the transmission source of the request message.

The third information delivered by the server 3, 4 may include the dynamic information. In this case, the server 3, 4 transmits, in a predetermined delivery cycle, the updated dynamic information to the vehicle 5 or the pedestrian terminal 70, which is the transmission source of the request message.

The dynamic information received by the vehicle 5 (third information) is information obtained by the server 3, 4 collecting change point information for each predetermined update cycle from a large number of vehicles 5 and roadside sensors 8 in the service area and integrating the collected change point information.

Therefore, the vehicle 5 at the dynamic information reception side can acquire dynamic information of not only an inside object within the sensing range of the on-vehicle camera 59 and the radar sensor 60 of the vehicle 5, but also an outside object that is present outside the sensing range.

Therefore, the action prediction unit 102 of the vehicle 5 may perform not only an action prediction process regarding the inside object based on the sensor information of the apparatus but also an action prediction process regarding the outside object.

Accordingly, also with respect to the outside object outside the sensing range of the vehicle 5, future positional information and the like of the object can be predicted.

In a case where the third information includes the server prediction information regarding an inside object, the action prediction unit 102 of the vehicle 5 may correct the vehicle prediction information on the basis of the difference between the vehicle prediction information generated from the sensor information of the vehicle 5 itself and the server prediction information included in the third information. Accordingly, the accuracy of vehicle prediction information can be improved.

As indicated by a broken line frame in FIG. 18, the vehicle 5 may cause the first information to include the vehicle prediction information outputted by the action prediction unit 102.

In this case, the server 3, 4 can collect the vehicle prediction information from a plurality of vehicles 5 included in the service area. Accordingly, the server 3, 4 can correct the server prediction information on the basis of the difference between the vehicle prediction information collected from the vehicles 5 in the service area and the server prediction information included in the dynamic information prediction map PM1, PM2.

Significance of Third Information

Figure 19:
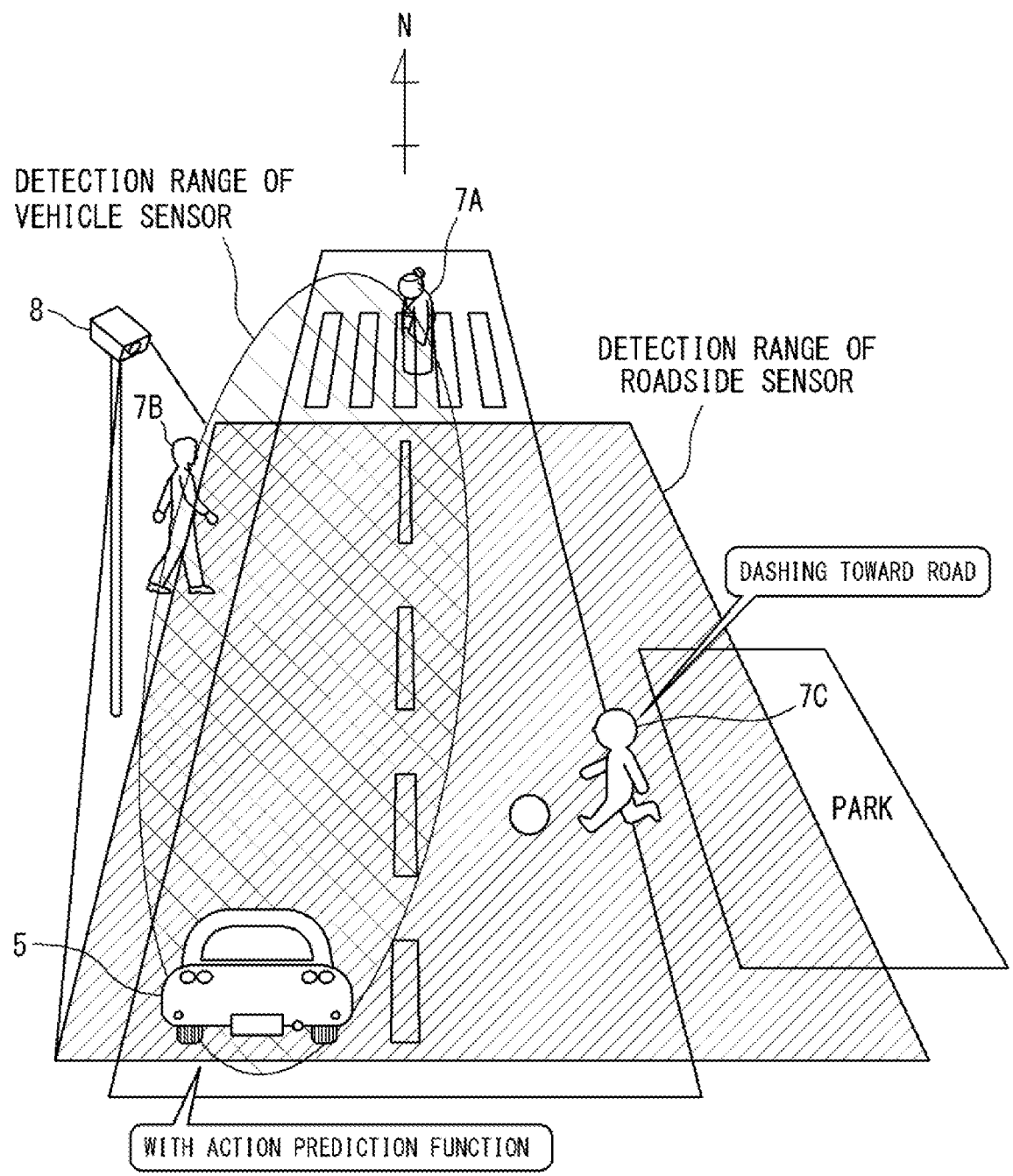
FIG. 19 is a diagram describing the significance of third information delivered by the server.

FIG. 19 is a diagram describing the significance of the third information delivered by the server 3, 4.

In FIG. 19, it is assumed that: a vehicle 5 is traveling on a road toward the north; and a pedestrian 7A who is passing on a crosswalk, a pedestrian 7B who is about to cross a portion outside the crosswalk, and a pedestrian 7C who has dashed from a park are present on the road.

In addition, it is assumed that: the pedestrians 7A, 7B are each an object within the detection range of the vehicle sensor (inside object); and the pedestrian 7C is an object that is outside the detection range of the vehicle sensor (outside object) but that is within the detection range of the roadside sensor 8.

In the state shown in FIG. 19, with respect to the pedestrians 7A, 7B, who are the inside objects, the action prediction unit 101 of the vehicle 5 can autonomously perform action prediction and notify the occupant of the result. However, since the vehicle sensor cannot detect the pedestrian 7C, who is an outside object, the action prediction unit 101 cannot perform action prediction therefor.

In this regard, according to the information providing system of the present embodiment, the third information received from the server 3, 4 includes the dynamic information of the pedestrian 7C.

Therefore, if the action prediction unit 102 of the vehicle 5 performs the action prediction process on the dynamic information of the pedestrian 7C received from the server 3, 4, the action prediction on the pedestrian 7C, who is an outside object, can also be performed.

In addition, according to the information providing system of the present embodiment, when the server 3, 4 performs the action prediction process, the third information received by the vehicle 5 from the server 3, 4 includes the server prediction information of the pedestrian 7C.

Therefore, irrespective of whether or not the vehicle 5 performs action prediction on an object, it becomes possible to notify the occupant in the vehicle 5 of the result of the action prediction on the pedestrian 7C, who is an outside object.

Sharing of the Area of the Action Prediction Process by Servers

Figure 20:
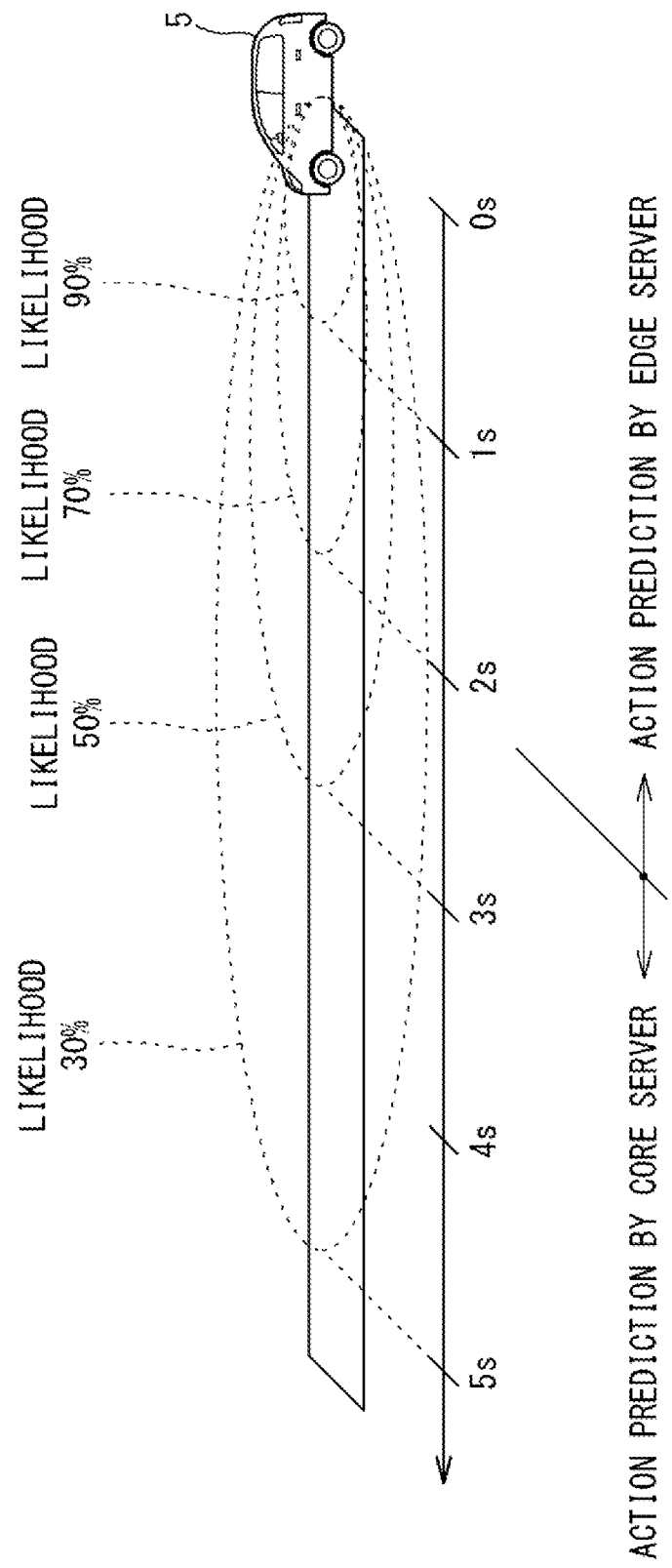
FIG. 20 is a diagram describing how the area of the action prediction process is shared by servers.

FIG. 20 is a diagram describing how the area of the action prediction process is shared by the servers 3, 4.

FIG. 20 assumes a road section on the downstream side (left side) starting from the vehicle 5 that is passing on a road.

In this case, it is considered that in accordance with an increase in the distance from the vehicle position at the present time point, that is, as the time advances, the likelihood according to the prediction information of the vehicle position by the servers 3, 4 decreases accordingly.

For example, FIG. 20 shows the likelihood at each elapsed time in a case where the edge server 3 predicts positional information of a vehicle 5 which is a target object. In FIG. 20, the likelihood after one second is 90%, the likelihood after two seconds is 70%, the likelihood after three seconds is 50%, and the likelihood after five seconds is 30%.

The edge server 3 can perform communication with lower delay than the core server 4, but is inferior to the core server 4 in terms of CPU performance. Conversely, the core server 4 has greater communication delay than the edge server 3, but is superior to the edge server 3 in terms of CPU performance.

Therefore, for example, it is preferable that the core server 4 predicts the positional information of the target object 5 after two seconds where the accuracy decreases to less than 70% calculated by the edge server 3. If the action prediction after two seconds where the likelihood according to the edge server 3 decreases is performed not by the edge server 3 but by the core server 4 which has higher performance, the likelihood in the action prediction can be improved.

The embodiment (including modifications) disclosed herein is merely illustrative and not restrictive in all aspects. The scope of the present disclosure is not limited to the embodiment described above, and includes all changes which come within the scope of equivalency of configurations described in the claims.

REFERENCE SIGNS LIST 1A communication terminal
1B communication terminal
1C communication terminal
1D communication terminal
2 base station
3 edge server
4 core server
5 vehicle (mobile terminal)
7 pedestrian
8 roadside sensor (fixed terminal)
9 traffic signal controller
31 control unit
32 ROM
33 RAM
34 storage unit
35 communication unit
41 control unit
42 ROM
43 RAM
44 storage unit
45 communication unit
50 on-vehicle apparatus
51 control unit
52 GPS receiver
53 vehicle speed sensor
54 gyro sensor
55 storage unit
56 display
57 speaker
58 input device
59 on-vehicle camera
60 radar sensor
61 communication unit
70 pedestrian terminal (mobile terminal)
71 control unit
72 storage unit
73 display unit
74 operation unit
75 communication unit
81 control unit
82 storage unit
83 roadside camera
84 radar sensor
85 communication unit

The invention claimed is:

1. An information providing system comprising:
one or a plurality of mobile terminals each configured to transmit first information based on own sensor information to a server;
one or a plurality of fixed terminals each configured to transmit second information based on own sensor information to the server; and
the server configured to generate third information on the basis of the first information and the second information that have been received by the server, and configured to transmit the generated third information to at least one of said mobile terminals,
the first information and the second information each include identification information capable of determining accuracy of the sensor information,
when a position of an object included in each piece of different information having been received satisfies a predetermined condition, the server selects either one of the first information and the second information on the basis of the identification information, and generates the third information on the basis of the selected information,
when the position of the object included in the first information and the position of the object included in the second information satisfy a predetermined condition, the server generates the third information on the basis of the second information, and
one or a plurality of said mobile terminals corrects the own sensor information on the basis of positional information of the object included in the third information.

2. The information providing system according to claim 1, wherein
one or a plurality of said mobile terminals generates the first information on the basis of the own sensor information and the third information that has been received by one or a plurality of said mobile terminals.

3. The information providing system according to claim 2, wherein
on the basis of the own sensor information and the third information that has been received by one or a plurality of said mobile terminals, one or a plurality of said mobile terminals detects an object of which state has changed, and sets change point information of the detected object, as the first information.

4. The information providing system according to claim 3, wherein
one or a plurality of said mobile terminals requests, for each predetermined cycle, the server for transmission of the third information, and when one or a plurality of said mobile terminals has not detected the object of which state has changed in the predetermined cycle, one or a plurality of said mobile terminals does not generate the first information.

5. The information providing system according to claim 1, wherein
the third information is dynamic information of an object to be superposed on map information.

6. The information providing system according to claim 1, wherein
the first information and the second information each include image data and positional information of a detected object, and
the server accumulates, for each object, the first information and the second information each including the image data of the object.

7. The information providing system according to claim 1, wherein one or a plurality of said mobile terminals is capable of generating vehicle prediction information as future dynamic information of an object, on the basis of the own sensor information, and causes the first information to include the generated vehicle prediction information.

8. A server configured to perform wireless communication with one or a plurality of mobile terminals and one or a plurality of fixed terminals,
the server includes
a first server belonging to a first network slice having a shorter delay time period, and
a second server belonging to a second network slice having a longer delay time period than the delay time period of the first network slice, and
the first server and the second server comprising:
a communication unit configured to receive, from one or a plurality of said mobile terminals, first information based on sensor information of one or a plurality of said mobile terminals, and configured to receive, from one or a plurality of said fixed terminals, second information based on sensor information of one or a plurality of said fixed terminals; and
a control unit configured to generate third information on the basis of the received first information and the received second information and control the communication unit so as to transmit the generated third information to at least one of said mobile terminal,
the control unit of the first server determines a priority of each of the first information and the second information, and determines whether the control unit of the first server generates the third information or the control unit of the second server is caused to generate the third information, in accordance with the determined priorities.

9. The server according to claim 8, wherein
a transmission cycle of the third information by the control unit of the first server is shorter than a transmission cycle of the third information by the control unit of the second server.

10. The server according to claim 8, wherein
when each priority satisfies a predetermined condition, the control units of the first server and the second server notify a transmission source of each of the first information and the second information, of an instruction for changing a transmission cycle of corresponding information.

11. A non-transitory computer readable storage medium storing a computer program configured to cause a computer to function as a server which performs wireless communication with one or a plurality of mobile terminals and one or a plurality of fixed terminals,
the server includes
a first server belonging to a first network slice having a shorter delay time period, wherein the first server comprises a computer, and
a second server belonging to a second network slice having a longer delay time period than the delay time period of the first network slice, wherein the second server comprises a computer, and
the computer program causing the computers of the first server and the second server to perform:
a step of receiving, from one or a plurality of said mobile terminal, first information based on sensor information of one or a plurality of said mobile terminals, and of receiving, from one or a plurality of said fixed terminals, second information based on sensor information of one or a plurality of said fixed terminals, and
a step of generating third information on the basis of the received first information and the received second information, and controlling a communication unit of the server so as to transmit the generated third information to at least one of said mobile terminals,
the computer program causing the computer of the first server to perform:
a step of determining a priority of each of the first information and the second information, and of determining whether the computer of the first server generates the third information or the computer of the second server is caused to generate the third information, in accordance with the determined priorities.

12. An information providing system comprising:
one or a plurality of mobile terminals each configured to transmit first information based on own sensor information to a server;
one or a plurality of fixed terminals each configured to transmit second information based on own sensor information to the server; and
the server configured to generate third information on the basis of the first information and the second information that have been received by the server, and configured to transmit the generated third information to at least one of said mobile terminals,
the server is capable of generating server prediction information as future dynamic information of an object, on the basis of the first information and the second information that have been received by the server,
the third information includes the generated server prediction information, one or a plurality of said mobile terminals is capable of generating vehicle prediction information as future dynamic information of an object, on the basis of the third information that has been received by one or a plurality of said mobile terminals, and one or a plurality of said mobile terminals corrects the vehicle prediction information generated by one or a plurality of said mobile terminals, on the basis of the server prediction information that has been received by one or a plurality of said mobile terminals.

13. The information providing system according to claim 12, wherein
one or a plurality of said mobile terminals causes the first information to include the vehicle prediction information generated by one or a plurality of said mobile terminals.

14. The information providing system according to claim 12, wherein
the server corrects the server prediction information generated by the server, on the basis of the vehicle prediction information that has been received by the server.

15. A server configured to perform wireless communication with one or a plurality of mobile terminals and one or a plurality of fixed terminals,
the server includes
a first server belonging to a first network slice having a shorter delay time period, and
a second server belonging to a second network slice having a longer delay time period than the delay time period of the first network slice, and
the first server and the second server comprising:
a communication unit configured to receive, from one or a plurality of said mobile terminals, first information based on sensor information of one or a plurality of said mobile terminals, and configured to receive, from one or a plurality of said fixed terminals, second information based on sensor information of one or a plurality of said fixed terminals; and
a control unit configured to generate third information on the basis of the received first information and the received second information and control the communication unit so as to transmit the generated third information to at least one of said mobile terminals,
the control units of the first server and the second server are capable of generating server prediction information as future dynamic information of an object, on the basis of the first information and the second information that have been received by the communication units of the first server and the second server, and
the third information includes the generated server prediction information,
the server prediction information generated by the control unit of the second server is dynamic information of a later time relative to that of the server prediction information generated by the control unit of the first server.

16. A non-transitory computer readable storage medium storing a computer program configured to cause a computer to function as a server which performs wireless communication with one or a plurality of mobile terminals and one or a plurality of fixed terminals,
the server includes
a first server belonging to a first network slice having a shorter delay time period, wherein the first server comprises a computer, and
a second server belonging to a second network slice having a longer delay time period than the delay time period of the first network slice, wherein the second server comprises a computer, and
the computer program causing the computers of the first server and the second server to perform:
a step of receiving, from one or a plurality of said mobile terminals, first information based on sensor information of one or a plurality of said mobile terminals, and of receiving, from one or a plurality of said fixed terminals, second information based on sensor information of one or a plurality of said fixed terminals; and
a step of generating third information on the basis of the received first information and the received second information, and controlling a communication unit of the server so as to transmit the generated third information to at least one of said mobile terminals,
a step of generating server prediction information as future dynamic information of an object, on the basis of the first information and the second information that have been received by the communication units of the first server and the second server, and
the third information includes the generated server prediction information,
the server prediction information generated by the computer of the second server is dynamic information of a later time relative to that of the server prediction information generated by the computer of the first server.

* * * * *

UNITED STATES PATENT AND TRADEMARK OFFICE
CERTIFICATE OF CORRECTION

| | |
|---|---|
| PATENT NO. | : 11,238,738 B2 |
| APPLICATION NO. | : 16/484380 |
| DATED | : February 1, 2022 |
| INVENTOR(S) | : Ichimaru et al. |

It is certified that error appears in the above-identified patent and that said Letters Patent is hereby corrected as shown below:

In the Claims

In Claim 7, Column 37, Lines 31-36, should read as follows:
--7. The information providing system according to claim 1, wherein
the mobile terminal is capable of generating vehicle prediction information as future dynamic information of an object, on the basis of the own sensor information, and causes the first information to include the generated vehicle prediction information.--.

In Claim 8, Column 37, Line 60, "mobile terminal," should read --mobile terminals,--.

In Claim 11, Column 38, Line 30, "mobile terminal," should read --mobile terminals,--.

Signed and Sealed this
Thirty-first Day of May, 2022

Katherine Kelly Vidal
*Director of the United States Patent and Trademark Office*